(12) United States Patent
Vaysman et al.

(10) Patent No.: US 11,829,218 B1
(45) Date of Patent: Nov. 28, 2023

(54) SOLID-STATE DEVICE WITH MULTIPLE THERMAL POWER STATES

(71) Applicant: Western Digital Technologies, Inc., San Jose, CA (US)

(72) Inventors: Dmitry Vaysman, San Jose, CA (US); Sartaj Ajrawat, Fremont, CA (US); Judah Gamliel Hahn, Ofra (IL); Julian Vlaiko, Kfar Saba (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/741,242

(22) Filed: May 10, 2022

(51) Int. Cl.
| | |
|---|---|
| G06F 1/26 | (2006.01) |
| G06F 1/20 | (2006.01) |
| G06F 13/16 | (2006.01) |
| G06F 1/3246 | (2019.01) |
| G06F 1/3225 | (2019.01) |
| G06F 1/3203 | (2019.01) |

(52) U.S. Cl.
CPC ............ *G06F 1/206* (2013.01); *G06F 1/3225* (2013.01); *G06F 1/3246* (2013.01); *G06F 13/1668* (2013.01); *G06F 1/3203* (2013.01)

(58) Field of Classification Search
CPC .... G06F 1/206; G06F 1/3221; G06F 11/3034; G06F 11/3058
USPC ........................................................ 713/300
See application file for complete search history.

(56) References Cited

U.S. PATENT DOCUMENTS

| | | | | |
|---|---|---|---|---|
| 6,369,973 B1* | 4/2002 | Mushika | ............ | G11B 5/59605 |
| | | | | 360/78.07 |
| 10,007,311 B2 | 6/2018 | Raghu et al. | | |
| 11,602,772 B1* | 3/2023 | Lefas | ........................ | B07B 1/46 |
| 11,604,499 B1* | 3/2023 | Hansen | ................ | G06F 1/3212 |
| 2012/0140402 A1* | 6/2012 | Mizumura | ......... | H05K 7/20836 |
| | | | | 361/679.33 |
| 2016/0124475 A1* | 5/2016 | Chandra | ................. | G06F 1/206 |
| | | | | 700/300 |
| 2017/0255211 A1* | 9/2017 | Haigh | ................. | G11B 33/1413 |
| 2017/0261380 A1* | 9/2017 | Cher | ....................... | G06F 1/206 |
| 2018/0284857 A1 | 10/2018 | Yang et al. | | |

(Continued)

FOREIGN PATENT DOCUMENTS

KR        20190002490 A        1/2019

*Primary Examiner* — Volvick Derose
(74) *Attorney, Agent, or Firm* — ARENTFOX SCHIFF LLP

(57) ABSTRACT

Aspects of a storage device are provided which apply advanced thermal throttling in response to temperature changes based on multiple thermal power states for different types of cells, such as SLCs and MLCs. Initially, a controller determines that a temperature of the memory meets a thermal throttling threshold of a plurality of thermal throttling thresholds. Subsequently, the controller transitions into a thermal power state of a plurality of thermal power states when the temperature meets the thermal throttling threshold. The controller applies a thermal mitigation configuration associated with the thermal power state. The controller then determines that the temperature of the memory has reached a thermal equilibrium in the thermal power state based on the thermal mitigation configuration. Storage device performance is thus improved through advanced thermal throttling without compromising data integrity.

19 Claims, 18 Drawing Sheets

(56) References Cited

U.S. PATENT DOCUMENTS

| | | | |
|---|---|---|---|
| 2019/0050153 A1 | 2/2019 | Yang et al. | |
| 2019/0065086 A1* | 2/2019 | Margetts | G06F 3/0688 |
| 2020/0050246 A1* | 2/2020 | Karalnik | G06F 1/3296 |
| 2020/0166977 A1 | 5/2020 | Jayaraman et al. | |
| 2020/0240668 A1* | 7/2020 | Bassa | G05B 13/028 |
| 2020/0288218 A1* | 9/2020 | Cates | G01N 33/0036 |
| 2021/0096973 A1* | 4/2021 | Jha | G06F 11/3006 |
| 2021/0263773 A1* | 8/2021 | Shah | G06F 1/206 |
| 2021/0405735 A1* | 12/2021 | Lattrel | G06F 1/206 |
| 2022/0317744 A1* | 10/2022 | Narigapalli | H05K 7/20709 |
| 2023/0074401 A1* | 3/2023 | Zhang | G01R 31/2874 |
| 2023/0076481 A1* | 3/2023 | Tang | G01K 7/425 |

* cited by examiner

SOLID-STATE DEVICE WITH MULTIPLE THERMAL POWER STATES

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store data into the NAND cells of the flash memory. NAND cells may include single-level cells (SLCs) or multiple-level cells (MLCs). Examples of MLCs include triple-level cells (TLCs), quad-level cells (QLCs), and penta-level cells (PLCs). Generally, the flash storage device may write data directly into pages of SLC blocks. However, data can only be erased in blocks of flash memory. Therefore, when a SLC block becomes full, the flash storage device may relocate the data into empty blocks through a garbage collection process to free up space in the flash memory. For example, the data may be relocated into blocks of MLCs.

As data is stored and accessed, the temperature of the NAND cells may increase beyond their reliable operating temperatures. For example, if the temperature of MLCs exceeds a certain thermal throttling threshold (e.g. 86° C.) due to data relocation from the SLCs, the integrity or reliability of the MLC data may be impacted. Therefore, in order to preserve system data integrity, thermal throttling may be applied to maintain the flash storage device below the thermal throttling threshold. For example, when the temperature of the cells exceeds 86° C., the flash storage device may disable parallel access to one or more dies or otherwise reduce the rate of data written to the NAND cells to reduce power consumption and subsequently lower the temperature back below the threshold. However, this reduction in NAND operations may significantly reduce performance of the flash storage device (e.g. by at least 50%), may result in degraded user experience, and may prevent the system from meeting performance benchmarks.

SUMMARY

One aspect of a storage device is disclosed herein. The storage device includes a memory and a controller. The controller is configured to determine that a temperature of the memory meets a thermal throttling threshold of a plurality of thermal throttling thresholds, transition into a thermal power state of a plurality of thermal power states when the temperature meets the thermal throttling threshold, apply a thermal mitigation configuration associated with the thermal power state, and determine that the temperature of the memory has reached a thermal equilibrium in the thermal power state based on the thermal mitigation configuration.

Another aspect of a storage device is disclosed herein. The storage device includes a memory and a controller. The controller is configured to adjust one or more thermal mitigation parameters associated with a thermal power state of a plurality of thermal power states based on a transition into the thermal power state when a temperature of the memory meets a thermal throttling threshold, and determine that the temperature of the memory has reached a thermal equilibrium in the thermal power state based on the adjusted one or more thermal mitigation parameters.

A further aspect of a storage device is disclosed herein. The storage device includes a memory and a controller. The memory has a block of cells. The controller is configured to apply a thermal mitigation configuration associated with a thermal power state of a plurality of thermal power states based on a transition into the thermal power state when a temperature of the block of cells meets a thermal throttling threshold, and determine that the temperature of the block of cells has reached a thermal equilibrium in the thermal power state based on the thermal mitigation configuration.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
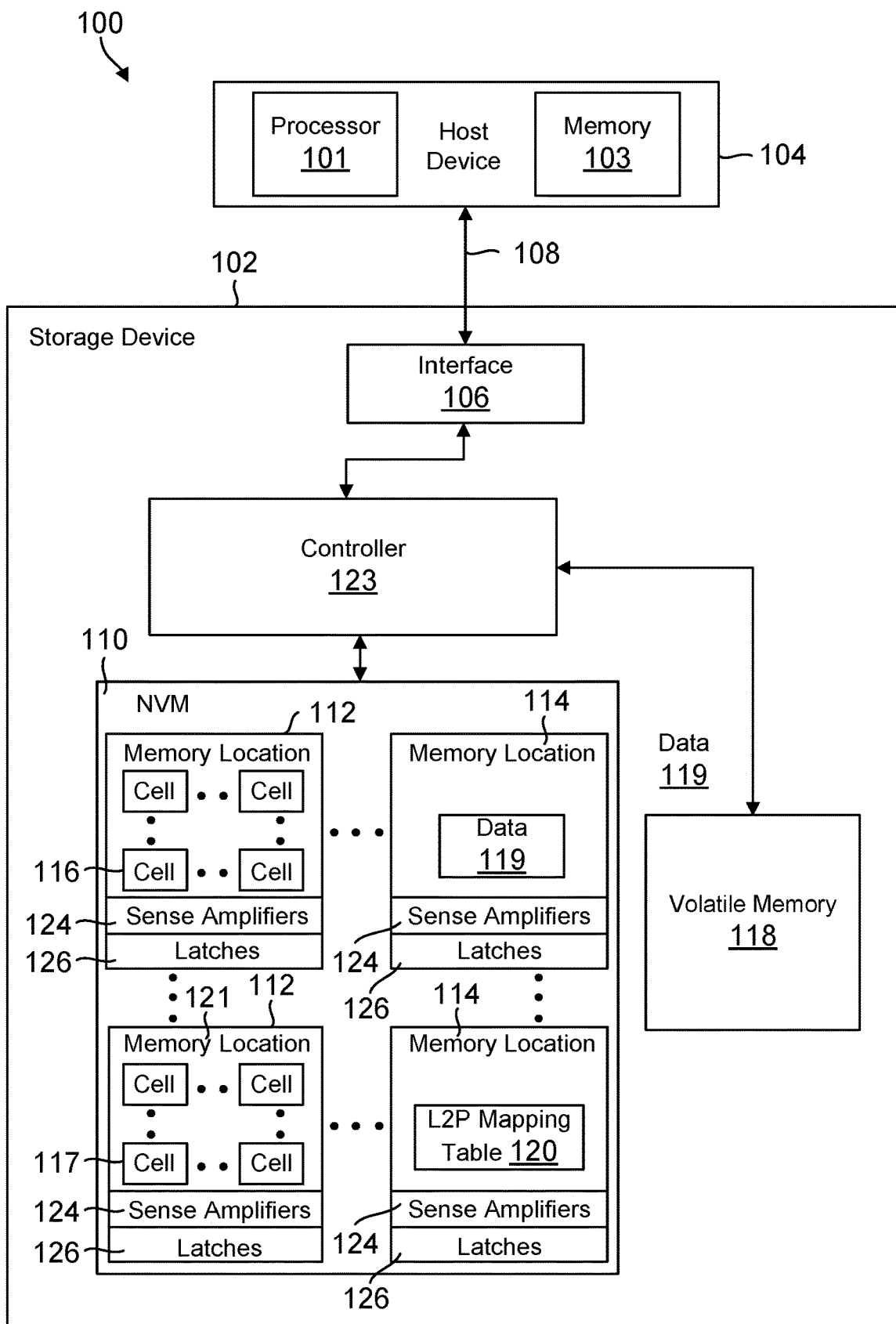
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

When a storage device performs thermal throttling, the storage device generally reduces a rate of data written to NAND cells as soon as the temperature of a die including the NAND cells exceeds a threshold. However, when performing thermal throttling, the thermal throttling causes hard transitions at thermal throttling thresholds. For example, the storage device typically performs thermal throttling with relatively large variations in data rates between transitions. For instance, the storage device may reduce write data rates with a first set of parameters when a die crosses a first thermal throttling threshold at 80° C., and further reduce the write data rates with a second set of parameters that vary significantly from the first set of fixed parameters when the die crosses a second thermal throttling threshold at 86° C. As a result of these large variations between transitions, device performance and power consumption may vary significantly between transitions over time and the user experience may be impacted.

Accordingly, to improve storage device performance and improve user experience, the present disclosure allows the storage device to selectively choose a specific thermal configuration and dynamically adjust internal mitigation parameters to reach the optimized and deterministic performance within a thermal envelope that targets reduced latency and minimal quality of service disruption by gradually adjusting the internal mitigation parameters over time (or preemptively) to align the storage device with host-specified temperature framework parameters. Typically, a controller of the storage device routes data to memory in response to write commands from a host by storing data directly in SLC blocks at a first data rate (e.g. full clock rate). As the number of free SLC blocks decreases, the controller relocates the data in SLC blocks to MLC blocks. This relocation may increase the temperature of the MLC blocks. When the temperature of the MLC blocks increases beyond a first thermal throttling threshold (e.g. TMT1, such as 80° C.), the controller changes how the data is routed to memory by disabling data relocation from the SLC blocks to the MLC blocks and by restricting writing of host data to SLC blocks. However, the controller performs thermal throttling this time by applying a selected thermal mitigation configuration associated with the thermal power state by scaling a power budget based on a temperature gradient to maintain the maximum possible performance while maintaining the thermal equilibrium within the thermal power state. This is in contrast to having large performance switching occur between thermal power state transitions when the storage device crosses a corresponding thermal throttling threshold, thus allowing data to be written at thermally throttled data rates that translate to the desired performance benchmarks for varying workloads within the adjusted power budget.

The controller may initially start writing host data in response to write commands to a blocks of cells at a first data rate (e.g., at full clock rate). The controller then continues writing host data in response to write commands to the blocks of cells, which may increase the temperature of the blocks of cells. If the temperature of the blocks of cells increases beyond a first thermal throttling threshold (e.g. TMT1, such as 80° C.), the controller may transition into a first thermal power state and enable thermal throttling. For example, the controller may reduce the rate of data written to SLC blocks and MLC blocks to a smaller, second data rate (e.g. at 60% of full clock rate), e.g. by applying a thermal mitigation configuration associated with the first thermal power state. The controller may reduce a power budget parameter (which decreases the amount of power consumption allocated to the storage device) until a thermal equilibrium is reached (e.g., a temperature gradient based on a measured temperature indicates neither a positive or negative rate of change in the temperature) based on the applied thermal mitigation configuration.

As a result, rather than employing thermal throttling resulting in hard power state transitions when the temperature of the storage device exceeds different thermal throttling thresholds (and consequently reducing performance), the storage device of the present disclosure applies advanced thermal throttling with multiple thermal power states that gradually decrease power respectively based on a temperature gradient along with other thermal mitigation parameters such as dynamic voltage and frequency scaling, queue depth adjustments and bus interconnection scaling. In this way, the storage device of the present disclosure provides improved user experience, enables meeting of performance benchmarks, and maintains data reliability through efficient NAND block usage.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host (s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infrared (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., SLC memory, MLC memory, TLC memory, QLC memory, PLC memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM 110 where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
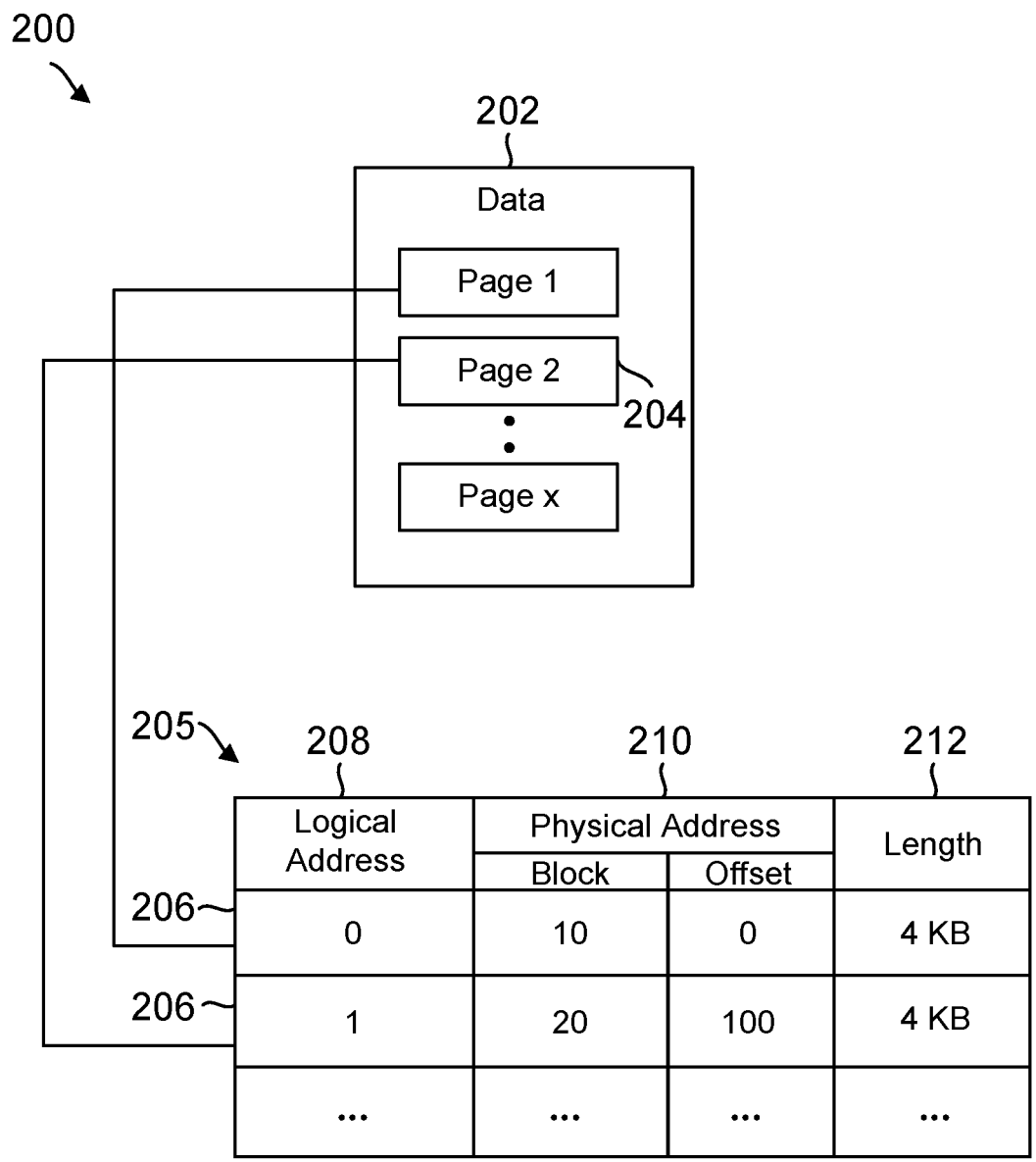
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
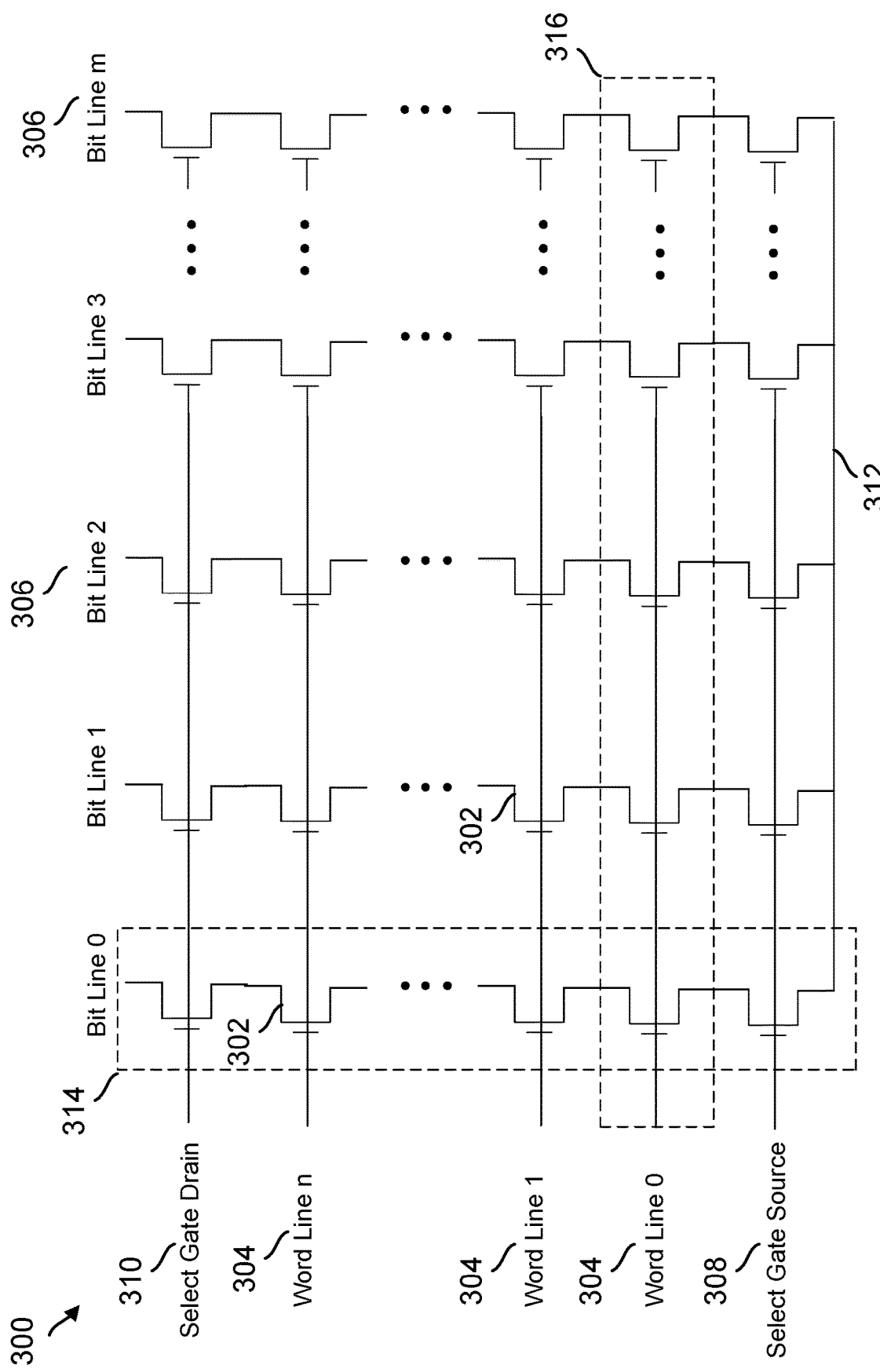
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
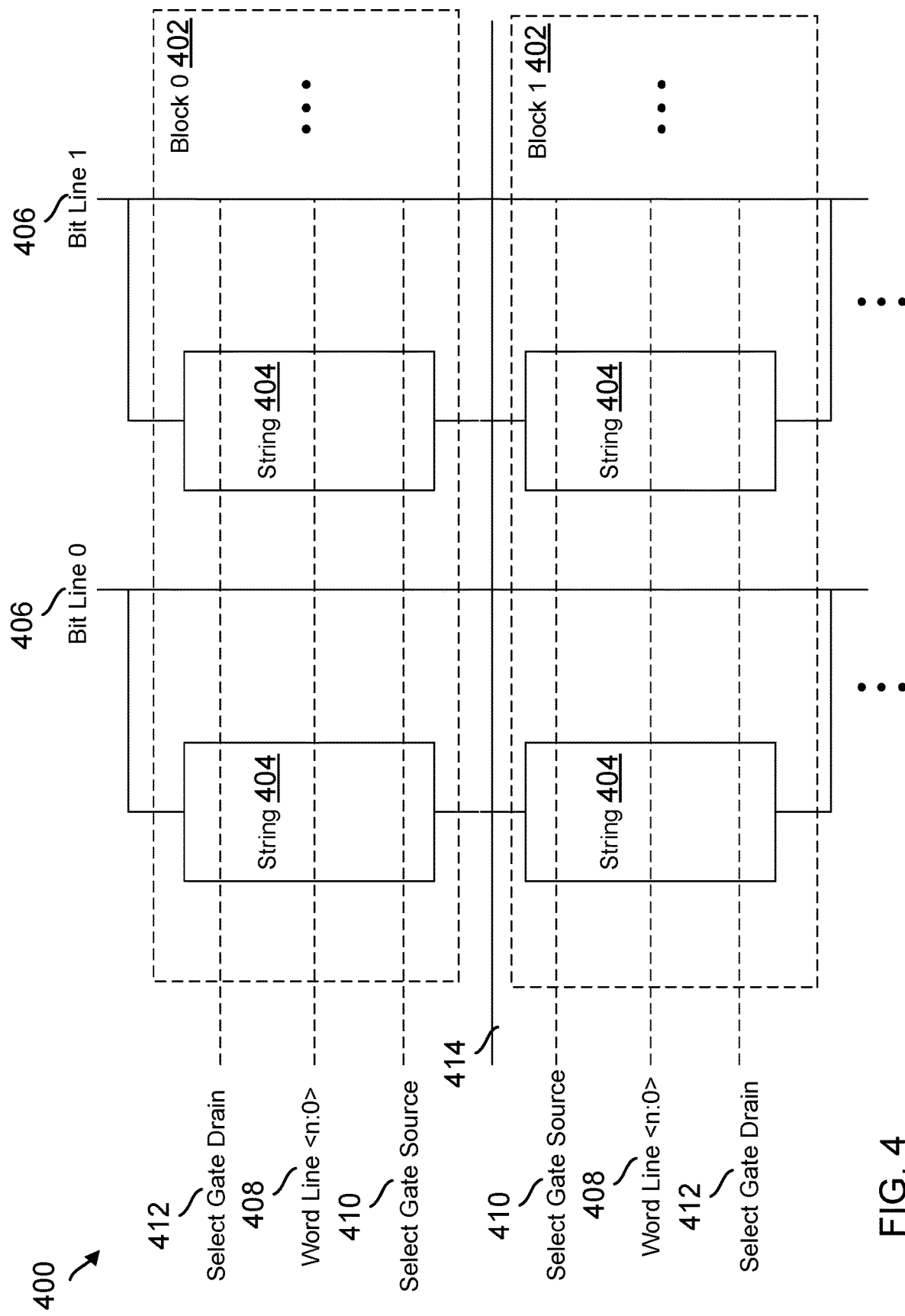
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

For cells that store multiple bits (e.g. MLCs, TLCs, etc.), each word line 304, 408 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 408 may include three pages 316, including a lower page (LP), a middle page (MP), and an upper page (UP), respectively corresponding to the different bits stored in the TLC. When programming TLCs, the LP may be programmed first, followed by the MP and then the UP. For example, a program voltage may be applied to the cell on the word line 304, 408 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 5:
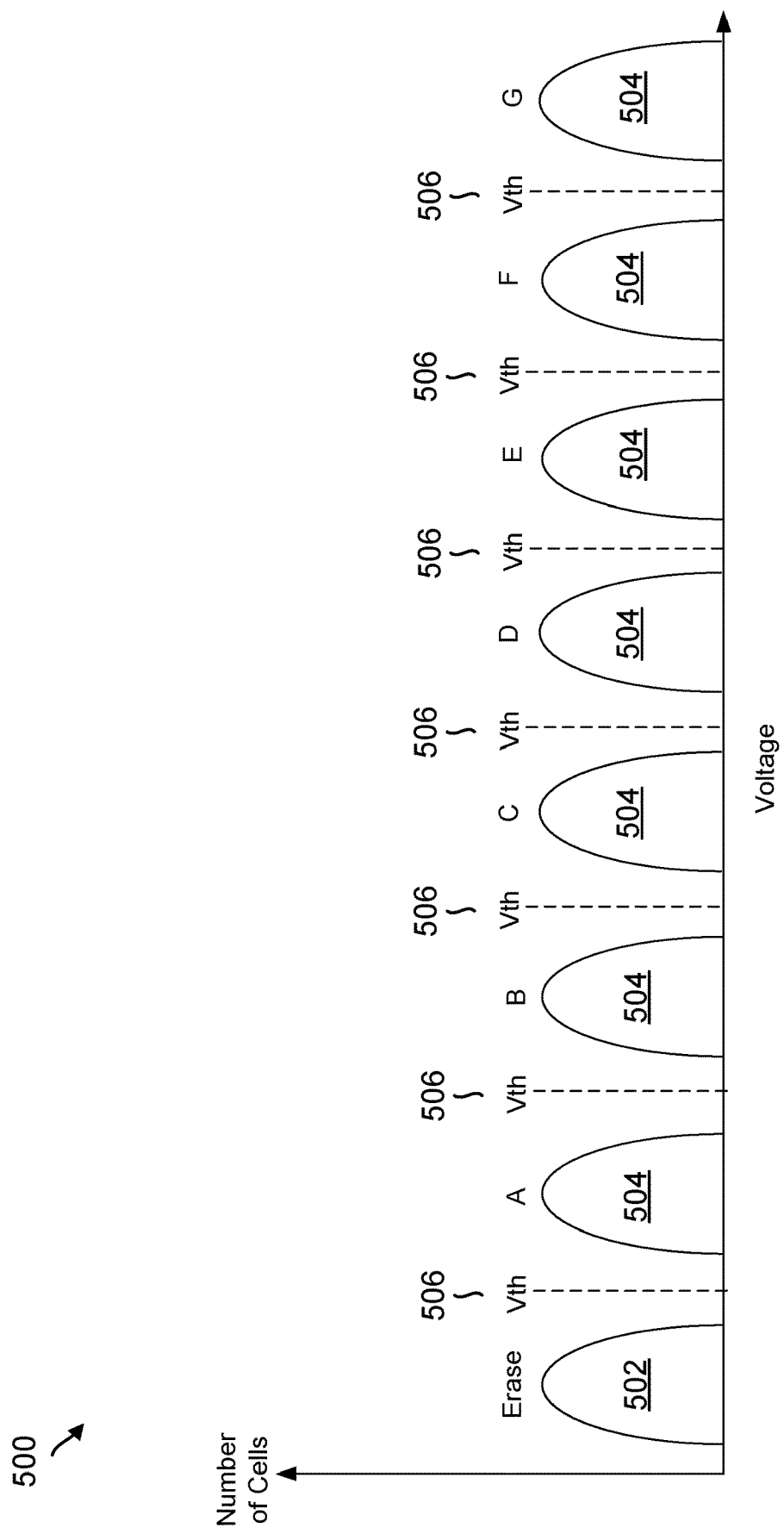
FIG. 5 is a graphical diagram illustrating an example of a voltage distribution chart for triple-level cells in the storage device of FIG. 1.

FIG. 5 illustrates an example of a voltage distribution chart 500 illustrating different NAND states for TLCs (e.g. cells 116, 302) storing three bits of data (e.g. logic 000, 001, etc. up to logic 111). The TLCs may include an erase state 502 corresponding to logic '111' and multiple program states 504 (e.g. A-G) corresponding to other logic values '000-110'. The program states 504 may be separated by different threshold voltages 506. Initially, the cells 116, 302 may be in the erase state 502, e.g. after the controller 123 erases a block 402 including the cells. When the controller 123 program LPs, MPs, and UPs as described above, the voltages of the cells 116, 302 may be increased until the threshold voltages 506 corresponding to the logic values to be stored are met, at which point the cells transition to their respective program states 504. While FIG. 5 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

Figure 6:
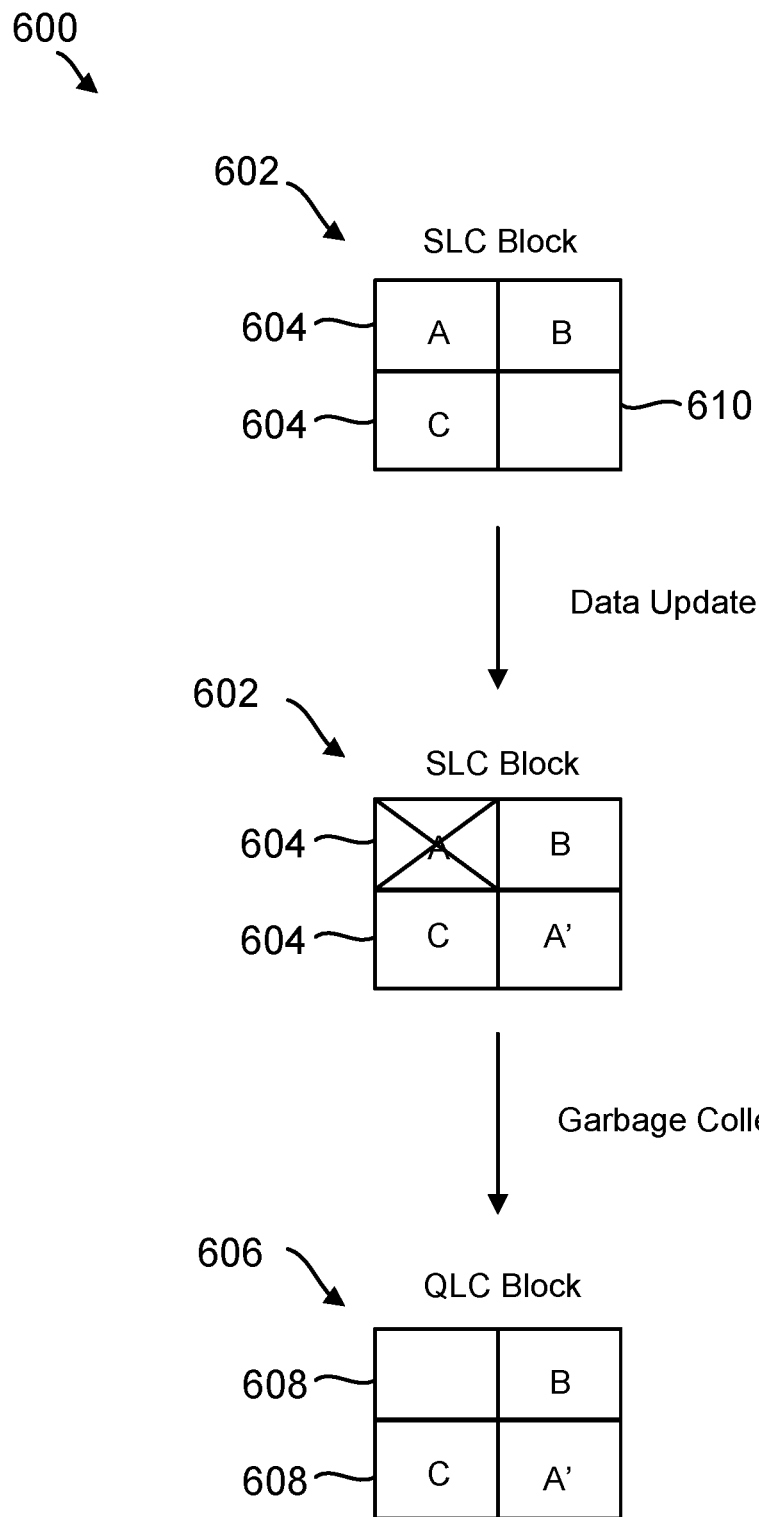
FIG. 6 is a conceptual diagram illustrating an example of a garbage collection (GC) process that may be implemented in the storage device of FIG. 1.

FIG. 6 is a conceptual diagram 600 of an example of a garbage collection process in which data stored in pages 604 of a block 602 of SLC cells are relocated to pages 608 of a block 606 of MLC cells. The data may correspond to the data 119 of FIG. 1, the blocks 602, 606 may correspond to the blocks 402 of FIG. 4, and the SLC/MLC cells may correspond to the cells 116, 302 of FIGS. 1 and 3. Each page 604, 608 includes data stored in multiple cells along a same row or word line (e.g. word line 304, 408) of the NVM. Thus, each page 604 may include data stored in a row of the cells 116 of one block, while each page 608 may include data stored in a row of the cells 116 of another block. For simplicity of illustration, the example of FIG. 6 illustrates the blocks 602, 606 each including only four pages 604, 608. However, it should be recognized that each block may include any number of pages.

In the example of FIG. 6, data represented by identifiers A, B, and C are stored in different pages 604 of the block 602. Originally, the data A, B, and C are stored in three pages of the block 602 in response to write commands from the host device, leaving one of the pages free in this example. When the storage device receives new or updated data, this data is stored in the free page 610. For example, updated data A' may be received from the host device and written to the free page 610. Since data cannot be overwritten in flash memory, the invalid data A remains stored in the block 602. As a result of new data and invalid data, the block 602 may quickly become full.

To free space in the SLC block, original and updated data in the block 602 may be transferred to the block 606. The invalid data remain in the old block. For instance, in the example of FIG. 6, the original data B and C and the updated data A' are read from the pages 604 of the block 602 and written to one or more pages 608 of the block 606. The invalid data A remains in the block 602. When the block 602 is subsequently erased, the invalid data is discarded, and the block 602 may be reused to store new data.

Referring back to FIG. 1, when there are no empty cells in an SLC block (e.g. block 602) available for storing data, the controller 123 performs garbage collection (e.g. as described above with respect to FIG. 6) by transferring data from the cells 116 in the SLC block to available cells in an MLC block (e.g. block 606). The controller 123 may then erase the SLC block including the cells 116. Once the cells 116 are free, the controller may continue to write data into the empty cells.

As the cells 116 in the MLC block (e.g. block 606) are read or written or as the ambient temperature of the storage device 102 increases, the cells may exceed their reliable operating temperatures, compromising data integrity. For example, as the temperature of a cell increases, the threshold voltages 506 of the cell separating the different program states 504 may change. Once the temperature reaches a certain temperature, the threshold voltages may no longer sufficiently separate the different program states, thus causing potential read errors and impacting data reliability.

When a storage device performs thermal throttling, the controller 123 generally reduces a rate of data written to NAND cells (e.g., 606) as soon as the temperature of a die including the NAND cells exceeds a thermal threshold. However, when performing thermal throttling, the thermal throttling causes hard transitions at thermal throttling thresholds. For example, the controller 123 typically performs thermal throttling with relatively large variations in data rates between transitions. For instance, the controller 123 may reduce write data rates with a first set of parameters when an MLC block (e.g., 606) crosses a first thermal throttling threshold at 80° C., and further reduces the write data rates with a second set of parameters that vary significantly from the first set of fixed parameters when the MLC block crosses a second thermal throttling threshold at 86° C. As a result of these large variations between transitions, device performance and power consumption may vary significantly between transitions over time and the user experience may be impacted.

Accordingly, to improve storage device performance and improve user experience, the present disclosure allows the controller 123 to selectively choose a specific thermal configuration and dynamically adjust internal mitigation parameters to reach the optimized and deterministic performance within a thermal envelope that targets reduced latency and minimal quality of service disruption by gradually adjusting the internal mitigation parameters over time (or preemptively) to align the storage device with host-specified temperature framework parameters. Typically, the controller 123 routes data to memory in response to write commands from the host device 104 by storing data directly in SLC blocks at a first data rate (e.g. full clock rate). As the number of free SLC blocks decreases, the controller 123 relocates the data in SLC blocks to MLC blocks. This relocation may increase the temperature of the MLC blocks. When the temperature of the MLC blocks increases beyond a first thermal throttling threshold (e.g. TMT1, such as 80° C.), the controller changes how the data is routed to memory by disabling data relocation from the SLC blocks to the MLC blocks and by restricting writing of host data to SLC blocks. However, the controller 123 performs thermal throttling this time by applying a selected thermal mitigation configuration associated with the thermal power state by scaling a power budget based on a temperature gradient to maintain the maximum possible performance while maintaining the thermal equilibrium within the thermal power state. This is in contrast to having large performance switching occur between thermal power state transitions when the block of cells (e.g., 602, 606) crosses a corresponding thermal throttling threshold, thus allowing data to be written at thermally throttled data rates that translate to the desired performance benchmarks for varying workloads within the adjusted power budget.

The controller 123 may initially start writing host data in response to write commands to a blocks of cells (e.g., 606) at a first data rate (e.g., at full clock rate). The controller 123 then continues writing host data in response to write commands to the blocks of cells, which may increase the temperature of the blocks of cells. If the temperature of the blocks of cells increases beyond a first thermal throttling threshold (e.g. TMT1, such as 80° C.), the controller 123 may transition into a first thermal power state and enable thermal throttling. For example, the controller 123 may reduce the rate of data written to SLC blocks and MLC blocks to a smaller, second data rate (e.g. at 60% of full clock rate), e.g. by applying a thermal mitigation configuration associated with the first thermal power state. The controller 123 may reduce a power budget parameter (which decreases the amount of power consumption allocated to the storage device) until a thermal equilibrium is reached (e.g., a temperature gradient based on a measured temperature indicates neither a positive or negative rate of change in the temperature) based on the applied thermal mitigation configuration. The controller 123 may further reduce the power consumption via additional thermal power states, which in turn reduces the temperature until As a result, rather than employing thermal throttling resulting in hard power state transitions when the temperature of the block of cells exceeds different thermal throttling thresholds (and consequently reducing performance), the storage device of the present disclosure applies advanced thermal throttling with multiple thermal power states that gradually decrease power respectively based on a temperature gradient along with adjustments to other thermal mitigation parameters such as dynamic voltage and frequency scaling, queue depth adjustments and bus interconnection scaling. In this way, the storage device of the present disclosure provides improved user experience, enables meeting of performance benchmarks, and maintains data reliability through efficient NAND block usage.

Figure 7:
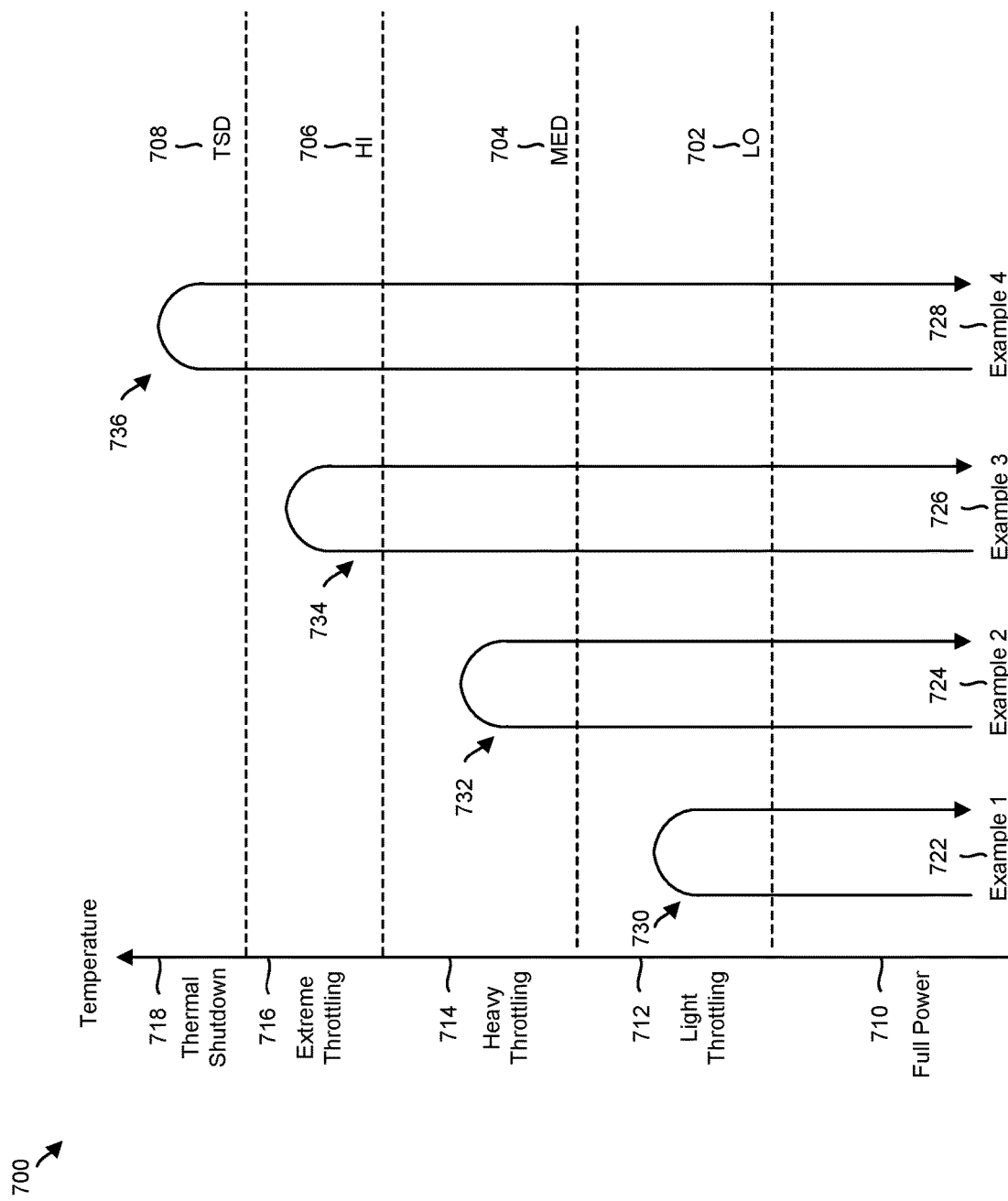
FIG. 7 illustrates an example diagram of thermal throttling in a storage device.

FIG. 7 illustrates an example diagram 700 of thermal throttling in a storage device. In thermal throttling, the controller increasingly limits access to the cells as the temperature rises in order to cool down the storage device. For example, the cells may be contained in one or more dies, and the controller may disable parallel access to an increasing number of dies as the temperature exceeds various thermal thresholds. In the example diagram 700, several thermal thresholds are configured for different levels of throttling, including a low (LO) thermal threshold 702, a medium (MED) thermal threshold 704, a high (HI) thermal threshold 706, and a thermal shut down (TSD) thermal threshold 708. For example, in the case of QLC temperatures, LO thermal threshold 702 may be 80° or another degree, MED thermal threshold 704 may be 86° or another degree, HI thermal threshold 706 may be 94° or another degree, and TSD thermal threshold 708 may be the maximum write temperature, e.g. 95°. These thermal thresholds are merely examples; any number of temperature thermal thresholds of varying degrees may be used. Moreover, the thermal thresholds may change depending on the cell type. For instance, in the case of TLC temperatures, the thermal thresholds may all be higher, while in the case of PLC temperatures, the thermal thresholds may all be lower.

The controller may perform different levels of throttling as the temperature of the cells exceeds the various thermal thresholds in order to more quickly reduce the temperature. For instance, when reducing die parallelism, the controller may apply light throttling 712 (e.g. throttling one die) when the temperature exceeds the LO thermal threshold 702, heavy throttling 714 (e.g. throttling two dies) when the temperature exceeds the MED thermal threshold 704, extreme throttling 716 (e.g. throttling three dies) when the temperature exceeds the HI thermal threshold 706, and thermal shutdown 718 (e.g. shutting down access to the dies) when the temperature exceeds the TSD thermal threshold 708. Other examples of throttling may be used; for instance, instead of disabling parallel access to one, two, or three dies, respectively, the storage device may disable parallel access to different numbers of dies, prevent reads or writes to different number of dies, restrict or limit access to different numbers or types of memory locations on the same die, or perform other temperature reducing schemes.

Accordingly, FIG. 7 illustrates various examples 722, 724, 726, 728 of different throttling level operations as the temperature 730, 732, 734, 736 of the cells rises, for example, due to read or write operations or ambient temperature increases. Referring to the first example 722, the storage device initially operates in a full power region 710, e.g. without throttling. When the temperature 730 exceeds the LO thermal threshold 702, the controller performs light throttling 712. In this example, light throttling 712 is sufficient to cause the temperature to taper off, and throttling is continued to be performed until the temperature decreases below the LO thermal threshold 702. The storage device then disables throttling, resuming full power operation.

Referring to the second example 724, the storage device initially operates in the full power region 710 without throttling. However, unlike the first example, when the temperature 732 exceeds the LO thermal threshold 702, light throttling 712 is insufficient to reduce the temperature, and so the temperature 732 continues to increase. When the temperature exceeds the MED thermal threshold 704, the controller performs heavy throttling 714. In this example, heavy throttling 714 is sufficient to cause the temperature to taper off, and throttling is continued to be performed until the temperature decreases below the MED thermal threshold 704. At that point, the controller switches to light throttling 712, which is continued to be performed until the temperature decreases below the LO thermal threshold 702. The storage device then disables throttling, resuming full power operation.

Referring to the third example 726, the storage device initially operates in the full power region 710 without throttling. However, unlike the first and second examples, when the temperature 734 exceeds the LO thermal threshold 702 and MED thermal thresholds 704, light throttling 712 and heavy throttling 714 are insufficient to reduce the temperature, and so the temperature 734 continues to increase. When the temperature exceeds the HI thermal threshold 706, the controller performs extreme throttling 716. In this example, extreme throttling 716 is sufficient to cause the temperature to taper off, and throttling is continued to be performed until the temperature decreases below the HI thermal threshold 706. At that point, the controller switches to heavy throttling 714, which is continued to be performed until the temperature decreases below the MED thermal threshold 704. At that point, the controller switches to light throttling 712, which is continued to be performed until the temperature decreases below the LO thermal threshold 702. The storage device then disables throttling, resuming full power operation.

Referring to the fourth example 728, the storage device initially operates in the full power region 710 without throttling. However, unlike the first and second examples, when the temperature 736 exceeds the LO thermal threshold 702 and MED thermal thresholds 704, light throttling 712 and heavy throttling 714 are insufficient to reduce the temperature, and so the temperature 736 continues to increase. When the temperature exceeds the HI thermal threshold 706, the controller performs extreme throttling 716. In this example, extreme throttling 716 is insufficient to cause the temperature to taper off, so the temperature continues to increase until it reaches the TSD thermal threshold 708. At this point, the controller performs thermal shutdown 718, for instance, shutting down access to the cells and/or the storage device until the temperature decreases back to the normal level.

When a storage device performs thermal throttling, the storage device generally reduces a rate of data written to NAND cells as soon as the temperature of a die including the NAND cells exceeds a thermal threshold. While thermal throttling, such as that described with respect to FIG. 7, may reduce the temperature of the storage device, it may also reduce system performance. However, when performing thermal throttling, the thermal throttling causes hard transitions at thermal throttling thresholds. For example, the storage device typically performs thermal throttling with relatively large variations in data rates between transitions. For instance, the storage device may reduce write data rates with a first set of parameters when a die crosses a first thermal throttling threshold at 80° C., and further reduce the write data rates with a second set of parameters that vary significantly from the first set of fixed parameters when the die crosses a second thermal throttling threshold at 86° C. As a result of these large variations between transitions, device performance and power consumption may vary significantly between transitions over time and the user experience may be impacted. Thus, device performance and user satisfaction may be reduced.

To improve device performance, the controller 123 may selectively choose a specific thermal configuration and dynamically adjust internal mitigation parameters to reach the optimized and deterministic performance within a thermal envelope that targets reduced latency and minimal quality of service disruption by gradually adjusting the internal mitigation parameters over time (or preemptively) to align the storage device with host-specified temperature framework parameters, as described below with respect to FIGS. 8-17. For example, the controller 123 may perform thermal throttling by applying a selected thermal mitigation configuration associated with the thermal power state by scaling a power budget based on a temperature gradient to maintain the maximum possible performance while maintaining the thermal equilibrium within the thermal power state. This is in contrast to having large performance switching occur between thermal power state transitions when the storage device crosses a corresponding thermal throttling threshold, thus allowing data to be written at thermally throttled data rates that translate to the desired performance benchmarks for varying workloads within the adjusted power budget.

The controller 123 may initially start writing host data in response to write commands to a blocks of cells at a first data rate (e.g., at full clock rate). The controller 123 then continues writing host data in response to write commands to the blocks of cells, which may increase the temperature of the blocks of cells. If the temperature of the blocks of cells increases beyond a first thermal throttling threshold (e.g. TMT1, such as 80° C.), the controller 123 may transition into a first thermal power state and enable thermal throttling. For example, the controller 123 may reduce the rate of data written to SLC blocks and MLC blocks to a smaller, second data rate (e.g. at 60% of full clock rate), e.g. by applying a thermal mitigation configuration associated with the first thermal power state. The controller 123 may reduce a power budget parameter (which decreases the amount of power consumption allocated to the storage device) until a thermal equilibrium is reached (e.g., a temperature gradient based on a measured temperature indicates neither a positive or negative rate of change in the temperature) based on the applied thermal mitigation configuration.

As a result, rather than employing thermal throttling resulting in hard power state transitions when the temperature of the storage device exceeds different thermal throttling thresholds (and consequently reducing performance), the storage device of the present disclosure applies advanced thermal throttling with multiple thermal power states that gradually decrease power respectively based on a temperature gradient along with other thermal mitigation parameters such as dynamic voltage and frequency scaling, queue depth adjustments and bus interconnection scaling. In this way, the storage device of the present disclosure provides improved user experience, enables meeting of performance benchmarks, and maintains data reliability through efficient NAND block usage.

Figure 8:
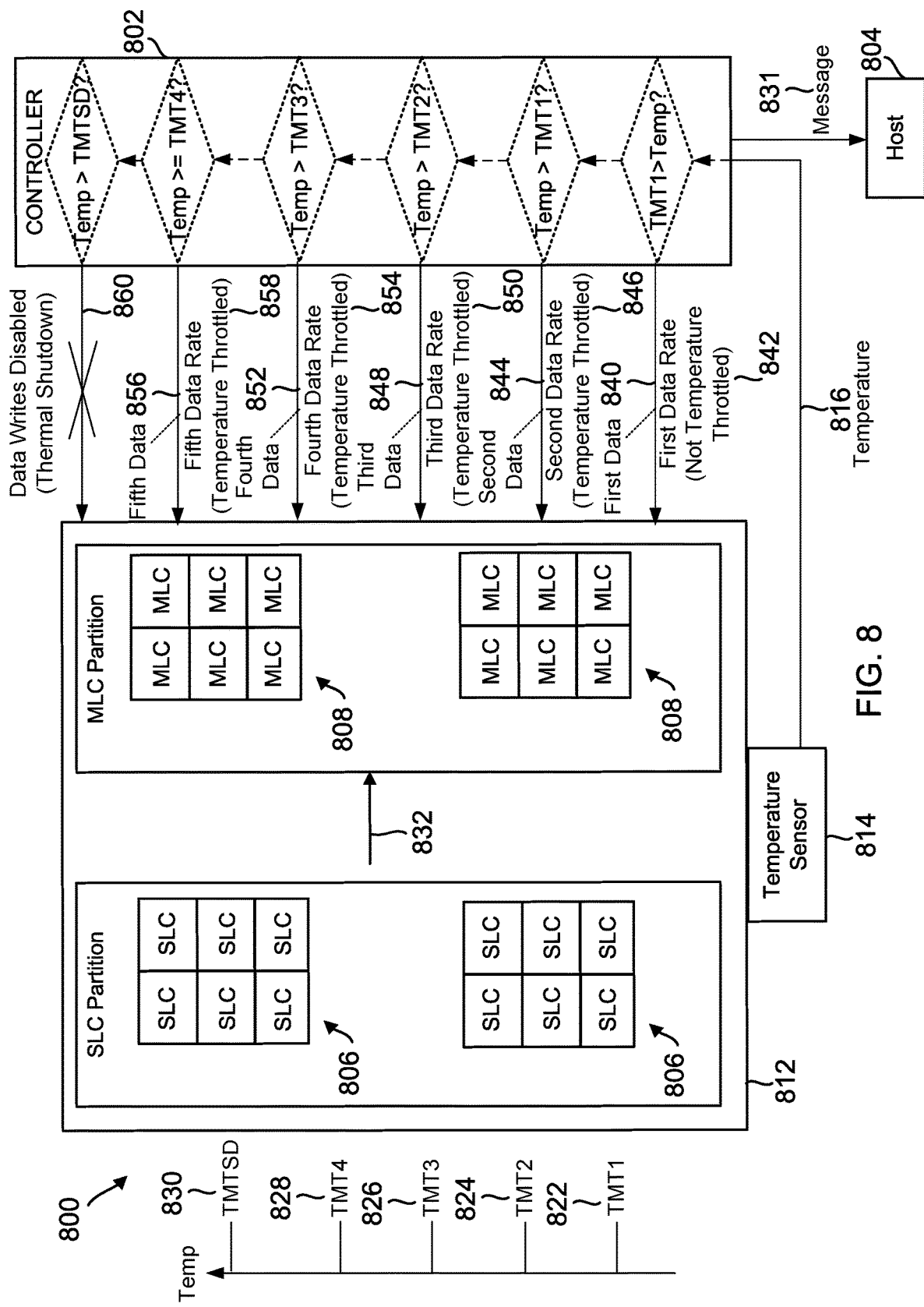
FIG. 8 is a conceptual diagram illustrating a controller writing data to a block at different data rates corresponding to different temperatures of the block using advanced thermal throttling in the storage device of FIG. 1.

FIG. 8 illustrates an example diagram 800 of a controller 802 of the storage device that writes data received from a host device 804 in one or more blocks 806, 808, 810 at different data rates corresponding to different temperatures of the block using advanced thermal throttling with multiple thermal power states in the storage device of FIG. 1. The blocks 808 may include cells which store more bits than the cells of the blocks 806. For example, blocks 806 may include pages of SLCs, while blocks 808 may include pages of MLCs (e.g. 2-bit cells, TLCs, QLCs, PLCs, etc.). Referring to FIG. 1, the controller 802 may correspond to the controller 123, the blocks 806 of SLCs may correspond to blocks 602 including cells 116, and the blocks 808 of MLCs may correspond to blocks 606 including cells 116. The blocks 806 and blocks 808, 810 may be stored in separate partitions of a die 812 (e.g. die 114 in FIG. 1). For example, blocks 806 may be stored in an SLC partition of die 812, while blocks 808, 810 may be stored in an MLC partition of the die 812.

The controller 802 may communicate with a temperature sensor 814 coupled to the die 812. The controller 802 may determine a temperature 816 of the cells in the blocks 806, 808, 810 based on periodically monitored readings from the temperature sensor 814. Upon determining the temperature, the controller 802 may apply advanced thermal throttling to the die 812 based on the different thermal power states of the blocks 806 and 808. For instance, the controller 802 may initially write first data 840 (e.g. data in response to one write command) to the blocks 806, 808 at a first data rate 842 when the temperature 816 is lower than a first thermal threshold (TMT1 822). Subsequently, the controller 802 may write second data 844 (e.g. data in response to another write command) to the blocks 806, 808 at a second data rate 846 (a throttled rate less than first data rate 842) when the temperature 816 meets the first thermal threshold (TMT1 822). The controller 802 may write third data 848 (e.g. data in response to another write command) to the blocks 806, 808 at a third data rate 850 (a throttled rate less than second data rate 846) when the temperature 816 meets the second thermal threshold (TMT2 824). The controller 802 may write fourth data 852 (e.g. data in response to another write command) to the blocks 806, 808 at a third data rate 854 (a throttled rate less than third data rate 850) when the temperature 816 meets the third thermal threshold (TMT3 826). The controller 802 may write fifth data 856 (e.g. data in response to another write command) to the blocks 806, 808 at a fifth data rate 858 (a throttled rate less than fourth data rate 854) when the temperature 816 meets the fourth thermal threshold (TMT4 828). Additionally, the controller may also perform a thermal shutdown, or disable all data writes, when the temperature 816 meets a thermal shutdown temperature (TMTSD 830) higher than TMT4. For instance, in one example, TMT1 may be 80° C., TMT2 may be 86° C., TMT3 may be 92° C., TMT4 may be 94° C., and TMTSD may be 95° C. Alternatively, TMT1, TMT2, TMT3, TMT4 and TMTSD may be different in other examples. Before thermal throttling (e.g. at TMT1) or thermal shutdown (e.g. at TMTSD) occurs, the controller may send a message 831 notifying the host device 804 of such event.

To free up blocks 806 prior to the temperature 816 reaching TMT1 822, the controller 802 may transfer data from blocks 806 to blocks 808 without thermal throttling depending on the temperature 816. For example, the controller may perform data relocation at first data rate 842 when the temperature is lesser than TMT1 822 (e.g. less than 80° C.). If the controller 802 determines that the temperature 816 later meets TMT1 822 (e.g. 80° C.), the controller may perform thermal throttling by applying a thermal mitigation configuration for the first thermal power state and consequently write subsequent data (e.g. second data 844) at the second data rate 846 to the blocks 808. For example, the controller may decrease the power consumption in the first thermal power state by reducing a power budget parameter value until a temperature gradient indicates that the temperature 816 reaches a thermal equilibrium. In another example, the controller may decrease the power consumption by scaling down a clock frequency, reducing a voltage of a corresponding voltage domain, reducing a number of bus interconnect lanes to the blocks 808, and/or reducing a host interface queue depth. If the temperature 816 later decreases below TMT1 822 in response to the throttled rate, the controller may re-enable data relocation from blocks 806 to blocks 808, and the controller may again write data at the first data rate 842 to the blocks 806, 808 without thermal throttling. Otherwise, if the temperature 816 increases to TMT2 824 despite the throttled rate, the controller may perform thermal throttling by applying a thermal mitigation configuration for the second thermal power state and consequently write subsequent data (e.g. third data 848) at the third data rate 850 to the blocks 808. For example, the controller may decrease the power consumption in the second thermal power state by reducing a power budget parameter value until a temperature gradient indicates that the temperature 816 reaches a thermal equilibrium. In another example, the controller may decrease the power consumption by scaling down a clock frequency, reducing a voltage of a corresponding voltage domain, reducing a number of bus interconnect lanes to the blocks 808, and/or reducing a host interface queue depth.

If the temperature 816 later decreases below TMT2 822 in response to the throttled rate, the controller apply the thermal mitigation configuration for the first thermal power state and consequently write subsequent data at the second data rate 846 to the blocks 808. Otherwise, if the temperature 816 increases to TMT3 826 despite the throttled rate, the controller may perform thermal throttling by applying a thermal mitigation configuration for the third thermal power state and consequently write subsequent data (e.g. fourth data 852) at the fourth data rate 854 to the blocks 808. For example, the controller may decrease the power consumption in the third thermal power state by scaling down a clock frequency, reducing a voltage of a corresponding voltage domain, and/or reducing a host interface queue depth.

If the temperature 816 later decreases below TMT3 824 in response to the throttled rate, the controller apply a thermal mitigation configuration for the second thermal power state and consequently write subsequent data at the third data rate 850 to the blocks 808. Otherwise, if the temperature 816 increases to TMT4 828 despite the throttled rate, the controller may perform thermal throttling by applying a thermal mitigation configuration for the fourth thermal power state and consequently write subsequent data (e.g. fifth data 856) at the fourth data rate 858 to the blocks 808. For example, the controller may decrease the power consumption in the fourth thermal power state by scaling down a clock frequency, reducing a voltage of a corresponding voltage domain, and/or reducing the operational duty cycle.

If the temperature 816 later decreases below TMT4 828 in response to the throttled rate, the controller apply a thermal mitigation configuration for the third thermal power state and consequently write subsequent data at the fourth data rate 854 to the blocks 808. Otherwise, if the temperature 816 increases to TMTSD 830 despite the throttled rate, the controller may initiate a thermal shutdown and disable further data writes to the blocks 808 until the temperature decreases back below TMT4.

Figure 9:
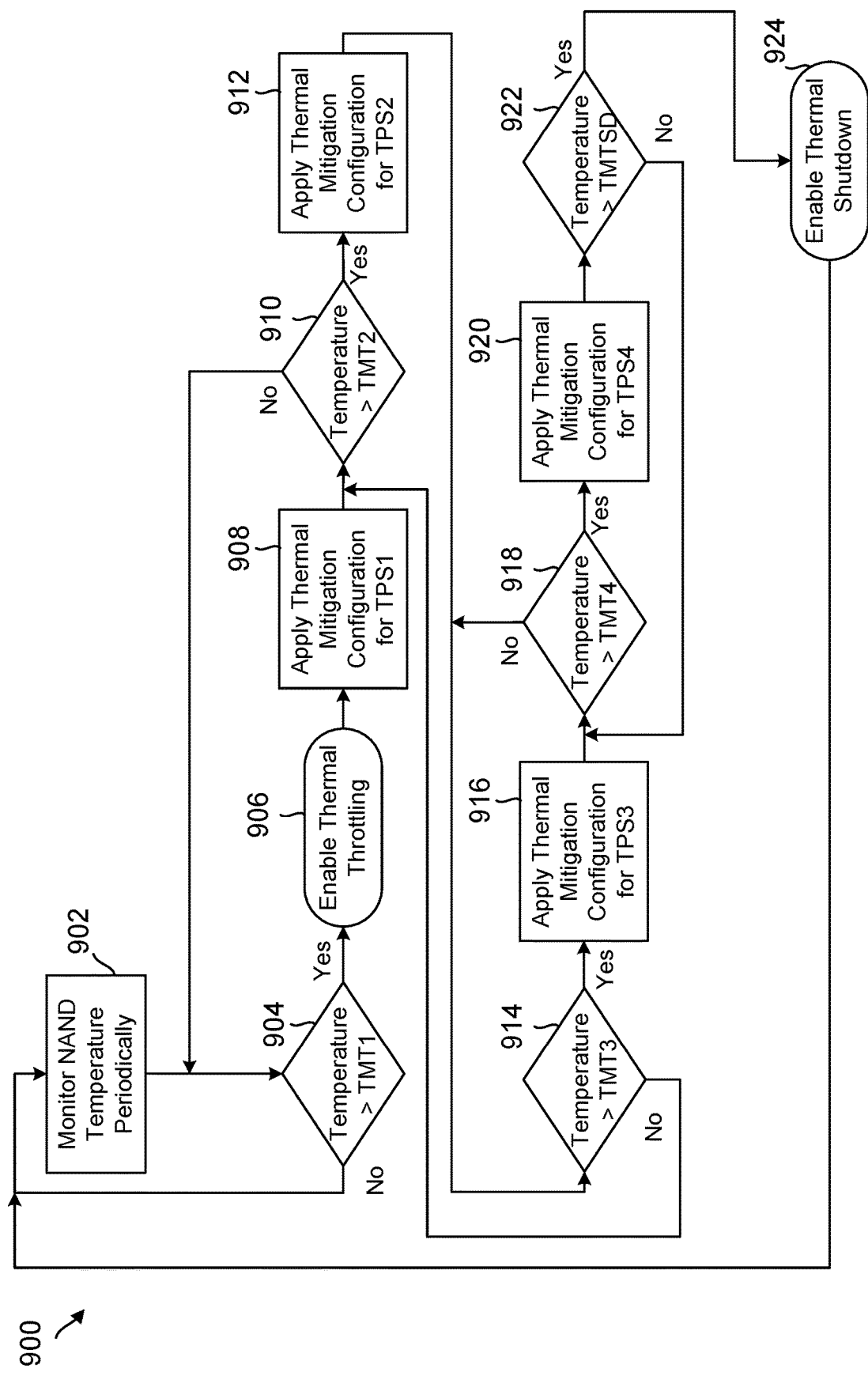
FIG. 9 is a flow chart illustrating an exemplary process for advanced thermal throttling in the storage device of FIG. 1.

FIG. 9 is a flowchart 900 illustrating an exemplary embodiment of a method for advanced thermal throttling with multiple thermal power states. For example, the method can be carried out in a storage device 102, such as the one illustrated in FIG. 1. Each of the steps in the flow chart can be controlled using the controller as described below (e.g. controller 123, 802), or by some other suitable means.

As represented by block 902, the controller may monitor NAND temperature periodically. For example, referring to FIGS. 1 and 8, the controller 123, 802 may acquire a temperature 816 of blocks 402, 806, 808 in die 114, 812 in the NVM 110 at regular intervals from temperature sensor 814, for example, periodically every minute or other amount of time.

As represented by block 904, the controller may determine whether the acquired temperature is greater than a first thermal threshold. For example, referring to FIGS. 1 and 8, the controller 123, 802 may determine whether temperature 816 is greater than TMT1 822.

If the temperature 816 is greater than TMT1 822, then as represented by block 906, the controller may decrease power consumption based on a temperature gradient. For example, referring to FIGS. 1 and 8, the controller 123, 802 may enable thermal throttling 906 at a first thermal power state (e.g., TPS1). If the temperature 816 is not greater than TMT1, then the controller may revert back to block 902 and continue monitoring the NAND temperature periodically.

Moreover, as represented by block 908, the controller may apply a thermal mitigation configuration for the first thermal power state (e.g., TPS1). For example, referring to FIGS. 1 and 8, the controller 123, 802 may decrease the power consumption with the thermal mitigation configuration in the first thermal power state by reducing a power budget parameter value until a temperature gradient indicates that the temperature 816 reaches a thermal equilibrium. In another example, the controller may further decrease the power consumption with the thermal mitigation configuration by scaling down a clock frequency by a predetermined percentage (or scaling factor), by reducing a voltage of a corresponding voltage domain, and/or by reducing a number of bus interconnect lanes to the blocks 808.

As represented by block 910, the controller may determine whether the acquired temperature is greater than a second thermal threshold. For example, referring to FIGS. 1 and 8, the controller 123, 802 may determine whether temperature 816 is greater than TMT2 824.

If the temperature 816 increases to TMT2 824 despite the throttled rate, then as represented by block 912, the controller may perform thermal throttling by applying a thermal mitigation configuration for the second thermal power state (e.g., TPS2). For example, referring to FIGS. 1 and 8, the controller 123, 802 may decrease the power consumption with the thermal mitigation configuration in the second thermal power state by reducing the power budget parameter value until the temperature gradient indicates that the temperature 816 reaches a thermal equilibrium. In another example, the controller may further decrease the power consumption with the thermal mitigation configuration by scaling down a clock frequency by a predetermined percentage (or scaling factor), by reducing a voltage of a corresponding voltage domain by a predetermined percentage (or scaling factor), and/or by reducing the number of bus interconnect lanes to the blocks 808.

If the temperature 816 does not increase to TMT2 822 in response to the throttled rate, the controller may revert back to block 904 and check whether the temperature meets the first thermal threshold, TMT1. In some aspects, the controller may also continue to monitor NAND temperature as described above at block 902. If it does, the controller can apply the thermal mitigation configuration for the first thermal power state to further gradually reduce the temperature while maintaining the performance benchmarks.

As represented by block 914, the controller may determine whether the acquired temperature is greater than a third thermal threshold. For example, referring to FIGS. 1 and 8, the controller 123, 802 may determine whether temperature 816 is greater than TMT3 826.

If the temperature 816 increases to TMT3 826 despite the throttled rate, then as represented by block 916, the controller may perform thermal throttling by applying a thermal mitigation configuration for the third thermal power state (e.g., TPS3). For example, referring to FIGS. 1 and 8, the controller 123, 802 may decrease the power consumption with the thermal mitigation configuration in the third thermal power state by reducing the power budget parameter value to the minimum allowed power consumption. In another example, the controller may further decrease the power consumption with the thermal mitigation configuration by scaling down a clock frequency by a predetermined percentage (or scaling factor), by reducing a voltage of a corresponding voltage domain by a predetermined percentage (or scaling factor), by reducing the number of bus interconnect lanes to the blocks 808, and/or by reducing a host interface queue depth.

If the temperature 816 does not increase to TMT3 826 in response to the throttled rate, the controller may revert back to block 910 and check whether the temperature meets the second thermal threshold, TMT2. In some aspects, the controller may also continue to monitor NAND temperature as described above at block 902. If it does, the controller can apply the thermal mitigation configuration for the second thermal power state to further gradually reduce the temperature while maintaining the performance benchmarks.

As represented by block 918, the controller may determine whether the acquired temperature is greater than a fourth thermal threshold. For example, referring to FIGS. 1 and 8, the controller 123, 802 may determine whether temperature 816 is greater than TMT4 828.

If the temperature 816 increases to TMT4 828 despite the throttled rate, then as represented by block 920, the controller may perform thermal throttling by applying a thermal mitigation configuration for the fourth thermal power state (e.g., TPS4). For example, referring to FIGS. 1 and 8, the controller 123, 802 may decrease the power consumption with the thermal mitigation configuration in the fourth thermal power state by reducing the power budget parameter value to the minimum allowed power consumption. In another example, the controller may further decrease the power consumption with the thermal mitigation configuration by scaling down a clock frequency by a predetermined percentage (or scaling factor), by reducing a voltage of a corresponding voltage domain by a predetermined percentage (or scaling factor), by reducing the number of bus interconnect lanes to the blocks 808, and/or by reducing the operational duty cycle.

If the temperature 816 does not increase to TMT4 828 in response to the throttled rate, the controller may revert back to block 914 and check whether the temperature meets the third thermal threshold, TMT3. In some aspects, the controller may also continue to monitor NAND temperature as described above at block 902. If it does, the controller can apply the thermal mitigation configuration for the third thermal power state to further gradually reduce the temperature while maintaining the performance benchmarks.

As represented by block 918, the controller may determine whether the acquired temperature is greater than a fourth thermal threshold. For example, referring to FIGS. 1 and 8, the controller 123, 802 may determine whether temperature 816 is greater than TMT4 828.

If the temperature 816 increases to TMTSD 830 despite the throttled rate, then as represented by block 920, the controller may initiate a thermal shutdown and disable further data writes to the NAND memory until the temperature decreases back below TMT4. If the temperature 816 does not increase to TMTSD 830 in response to the throttled rate, the controller may revert back to block 918 and check whether the temperature meets the third thermal threshold, TMT4. In some aspects, the controller may also continue to monitor NAND temperature as described above at block 902. If it does, the controller can apply the thermal mitigation configuration for the fourth thermal power state to further gradually reduce the temperature while maintaining the performance benchmarks.

Figure 10:
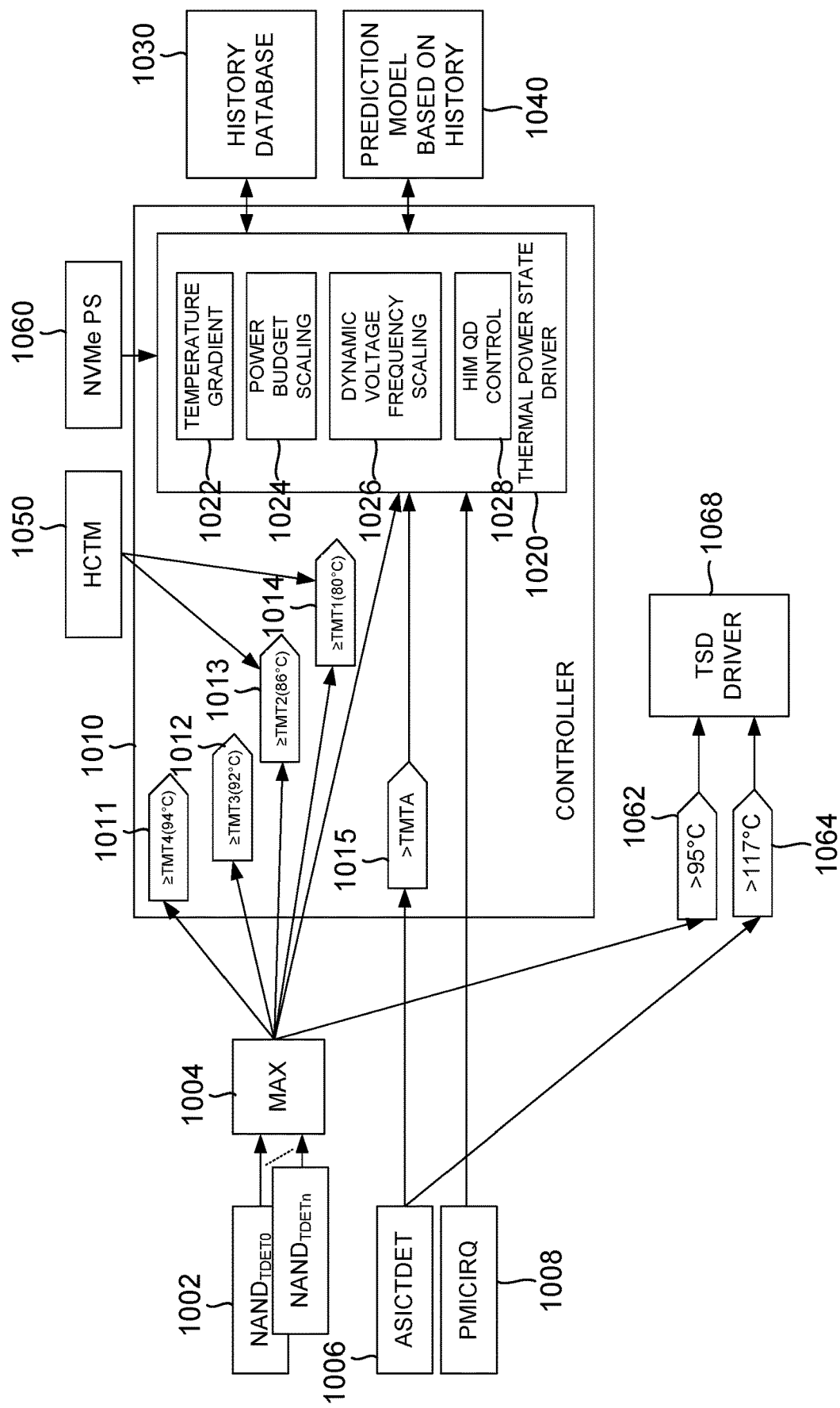
FIG. 10 is a conceptual diagram illustrating a controller for advanced thermal throttling using multiple thermal power states in the storage device of FIG. 1.

FIG. 10 is a conceptual diagram illustrating a controller 1010 for advanced thermal throttling using multiple thermal power states in the storage device of FIG. 1. The controller 1010 is communicatively coupled to temperature sensors 1002 via a maximum filter module 1004 and to sensors 1006 and 1008. The controller 1010 is also communicatively coupled to host-controlled thermal management (HCTM) module 1050 and non-volatile memory host controller module 1060. The controller 1010 includes temperature comparators 1011-1015 and thermal power state driver 1020. The controller 1010 is also communicatively coupled to a history database 1030 and a prediction model 1040. In some aspects, the history database 1030 may store historical information relating to temperature measurements of the storage device including performance benchmarks correlated with any historical adjustments in temperature and/or power. In some apects, the prediction model 1040 may be a neural network that is trained to infer a temperature for the storage device based on real-time information from the storage device and/or the historical information stored in the hi story database 1030.

The thermal power state driver 1020 includes a temperature gradient module 1022, a power budget scaling module 1024, a dynamic voltage frequency scaling module 1026 and a host interface management (HIM) queue depth (QD) control module 1028. The HCTM module 1050 may be communicatively coupled to temperature comparators 1013 and 1014. The temperature sensor 1006 may be communicatively coupled to the temperature comparator 1015 and to a temperature comparator 1064. The sensor 1008 may be communicatively coupled to the thermal power state driver 1020. The maximum filter module 1004 may be communicatively coupled to the temperature comparators 1011-1014, to the thermal power state driver 1020, and to a temperature comparator 1062. The temperature comparators 1062 and 1064 may be communicatively coupled to a thermal shutdown (TSD) driver 1068. The history database 1030 and the prediction module 1040 may be communicatively coupled to the thermal power state driver 1020.

Figure 11:
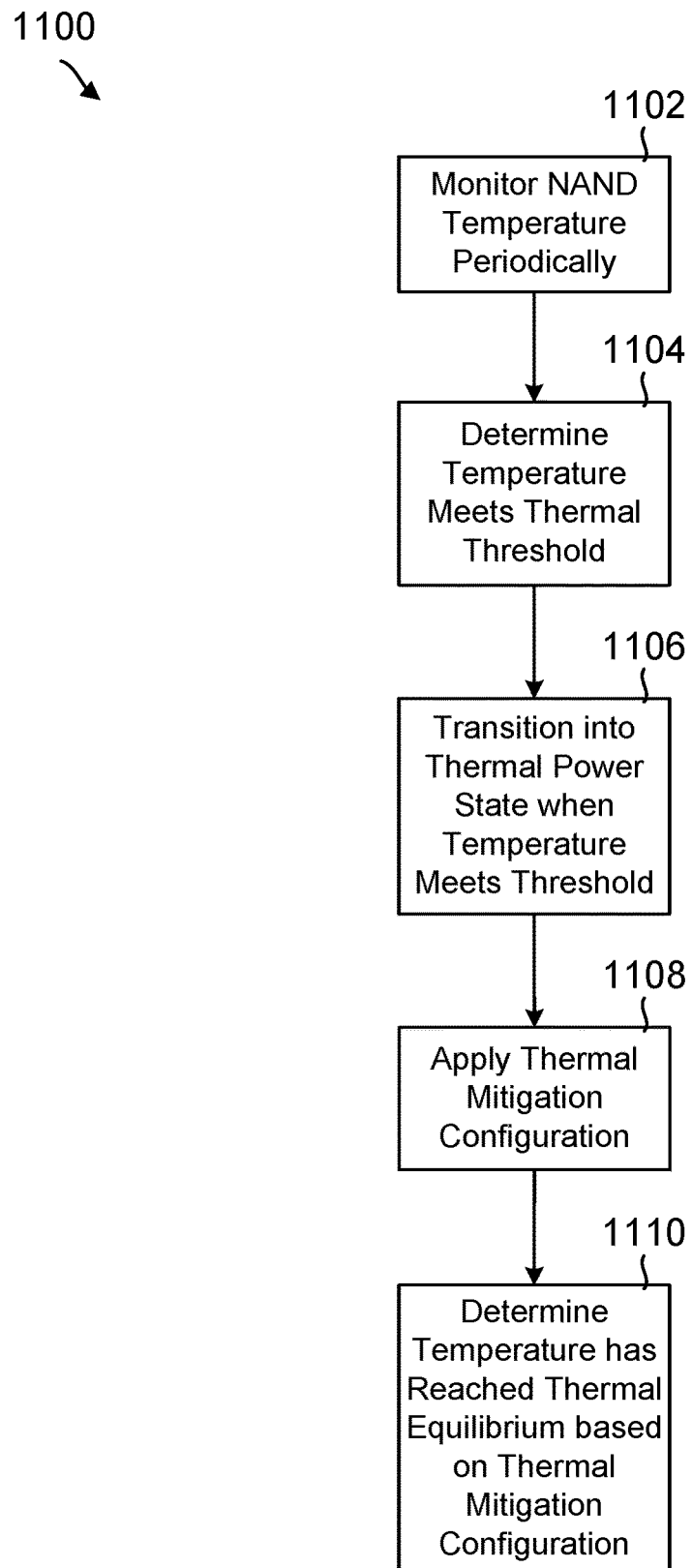
FIG. 11 is a flow chart illustrating an exemplary process for advanced thermal throttling using multiple thermal power states in the storage device of FIG. 1.

FIG. 11 is a flow chart illustrating an exemplary process for advanced thermal throttling using multiple thermal power states in the storage device of FIG. 1. For example, the method can be carried out in a storage device 102, such as the one illustrated in FIG. 1. Each of the steps in the flow chart can be controlled using the controller as described below (e.g. controller 123, 802, 1010), or by some other suitable means.

As represented by block 1102, the controller 1010 may monitor NAND temperature periodically. For example, referring to FIGS. 1 and 10, the controller 123, 1010 may acquire a temperature of blocks 402 in die 114, 812 in the NVM 110 at regular intervals from temperature sensors 1002 and/or sensors 1006, 1008, for example, periodically every minute or other amount of time. In some aspects, the controller 1010 may acquire the NAND temperature of the NVM 110 at a first sampling rate based on the NAND temperature of the NVM 110 not exceeding a first thermal threshold (e.g., TMT1 set at 80° C.). In other aspects, the controller 1010 may acquire the NAND temperature of the NVM 110 at a second sampling rate greater than the first sampling rate based on the NAND temperature of the NVM 110 exceeding the first thermal threshold (e.g., TMT1). For example, the temperature sampling rate may be increased fourfold after the temperature exceeds TMT1.

In some aspects, the maximum filter module 1004 may receive an array of temperature measurements from the temperature sensors 1002. In one or more implementations, the maximum filter module 1004 may filter the temperature measurements such that the sample with the highest measured temperature may be filtered out and provided to the controller 1010 for processing by the temperature comparators 1011-1014. In one or more other implementations, the maximum filter module 1004 may filter out a highest measured temperature sample for each of the temperature sensors 1002 to be processed by the temperature comparators 1011-1014.

As represented by block 1104, the controller may determine that a temperature of the memory meets a thermal threshold of a plurality of thermal thresholds. For example, referring to FIGS. 1 and 10, the controller 1010 may compare the NAND temperature of the NVM 110 against the temperature comparator 1014 to determine whether the temperature meets or exceeds TMT1. In another example, referring to FIGS. 1 and 10, the controller 1010 may compare the NAND temperature of the NVM 110 against the temperature comparator 1013 to determine whether the temperature meets or exceeds TMT2. In still another example, referring to FIGS. 1 and 10, the controller 1010 may compare the NAND temperature of the NVM 110 against the temperature comparator 1012 to determine whether the temperature meets or exceeds TMT3. In yet another example, referring to FIGS. 1 and 10, the controller 1010 may compare the NAND temperature of the NVM 110 against the temperature comparator 1011 to determine whether the temperature meets or exceeds TMT4. In some aspects, the controller 1010 may compare a temperature obtained by the temperature sensor 1006 against the temperature comparator 1015 to determine whether the temperature meets or exceeds a thermal threshold specific to an application-specific integrated circuit (ASIC) in the storage device of FIG. 1. In still another example, referring to FIGS. 1 and 10, the controller 1010 may compare the NAND temperature of the NVM 110 against the temperature comparator 1062 to determine whether the temperature meets or exceeds TMTSD. In other aspects, the controller 1010 may compare the temperature obtained by the temperature sensor 1006 against the temperature comparator 1064 to determine whether the temperature meets or exceeds a thermal shutdown threshold specific to the ASIC in the storage device of FIG. 1. Based on the comparator results of the temperature comparators 1062 and/or 1064, the TSD driver 1068 may be triggered to issue a thermal shutdown of the NVM 110.

As represented by block 1106, the controller may transition into a thermal power state of a plurality of thermal power states when the temperature meets the thermal threshold. For example, referring to FIG. 10, the controller 1010 may follow a state machine algorithm that controls the transitions between the thermal power states. The results from one or more of the temperature comparators 1011-1014 can be fed as input to the state machine. For example, referring to FIG. 10, the controller 1010 may transition into a first thermal power state based on the temperature comparator 1014 indicating that the NAND temperature meets or exceedsTMT1. In another example, referring to FIG. 10, the controller 1010 may transition into a second thermal power state based on the temperature comparator 1013 indicating that the NAND temperature meets or exceedsTMT2. In still another example, referring to FIG. 10, the controller 1010 may transition into a third thermal power state based on the temperature comparator 1012 indicating that the NAND temperature meets or exceedsTMT3. In yet another example, referring to FIG. 10, the controller 1010 may transition into a fourth thermal power state based on the temperature comparator 1011 indicating that the NAND temperature meets or exceeds TMT4.

As represented by block 1108, the controller may apply a thermal mitigation configuration associated with the thermal power state. In applying the thermal mitigation configuration, the controller may adjust one or more thermal mitigation parameters associated with the thermal power state. For example, referring to FIGS. 1 and 10, the controller 1010 may apply a selective thermal mitigation configuration that gradually decreases the power consumption to proportionately reduce the temperature in the NVM 110 while maintaining the performance benchmarks for the storage device.

In some aspects of adjusting the one or more thermal mitigation parameters, the controller may adjust a power budget parameter based on a temperature gradient associated with the temperature. In some aspects, the power budget parameter indicates a power consumption allocation corresponding to a maximum performance achievable by one or more storage operations of the storage device operating in the thermal power state. For example, referring to FIG. 10, the controller 1010 may adjust the power budget parameter using the power budget scaling module 1024 based on the temperature gradient value provided by the temperature gradient module 1022. In some aspects, the temperature gradient module 1022 may obtain the temperature measurements from the temperature sensors 1002 to determine the rate of change in the temperature along with the direction of the change in temperature (e.g., positive to denote a rate increase, negative to denote a rate decrease, or neutral to denote no change).

In some aspects of adjusting the power budget parameter, the controller may reduce a value of the power budget parameter based on the temperature gradient indicating a positive rate of change in the temperature. In some aspects, the value of the power budget parameter is reduced until the temperature gradient indicates the thermal equilibrium (e.g., neutral value to denote no change in temperature). In other aspects of adjusting the power budget parameter, the controller may increase a value of the power budget parameter based on the temperature gradient indicating a negative rate of change in the temperature. In some aspects, the value of the power budget parameter is increased until the temperature gradient indicates the thermal equilibrium. In this regard, if the temperature gradient indicates no rate of change in either direction, then the power budget parameter is not adjusted.

In other aspects of adjusting the one or more thermal mitigation parameters, the controller may adjust a clock frequency parameter associated with one or more clock domains of the storage device with a value that corresponds to a predetermined clock frequency associated with the thermal power state. For example, referring to FIG. 10, the controller 1010 may adjust the clock frequency parameters using the dynamic voltage frequency scaling module 1026.

For example, for TPS1, the clock frequency parameter is adjusted from full clock rate down to 60% of the full clock rate. In another example, for TPS2, the clock frequency parameter is adjusted from full clock rate down to 40% of the full clock rate. In still another example, for TPS3 and/or TPS4, the clock frequency parameter is adjusted from full clock rate down to 10% of the full clock rate.

In still other aspects of adjusting the one or more thermal mitigation parameters, the controller may adjust a voltage parameter associated with one or more voltage domains of the storage device with a value that corresponds to a predetermined voltage associated with the thermal power state. For example, referring to FIG. 10, the controller 1010 may adjust the voltage parameter using the dynamic voltage frequency scaling module 1026. For example, for either of the thermal power states (e.g., TPS1-TPS4), the voltage parameter is adjusted from full voltage for a particular voltage domain (e.g., core voltage) down to 75% of the full voltage.

In yet still other aspects of adjusting the one or more thermal mitigation parameters, the controller may adjust a bus interface parameter associated with an interconnection between the memory and the controller with a first value that corresponds to a predetermined number of interconnection lanes associated with the thermal power state. For example, referring to FIG. 10, the controller 1010 may adjust the bus interface parameter using the non-volatile memory host controller module 1060. For example, for some of the later thermal power states (e.g., TPS2-TPS4), the bus interface parameter is adjusted down proportionately from a full number of lanes available for bandwidth.

In still other aspects of adjusting the one or more thermal mitigation parameters, the controller may adjust a queue depth parameter associated with a host interface of the storage device with a value that corresponds to a predetermined queue depth associated with the thermal power state. For example, referring to FIG. 10, the controller 1010 may adjust the queue depth parameter using the HIM QD control module 1028. For example, for some of the thermal power states (e.g., TPS3-TPS4), the queue depth parameter is adjusted from the full queue depth of 256 down to a reduced queue depth of 8.

As represented by block 1110, the controller may determine that the temperature of the memory has reached a thermal equilibrium in the thermal power state based on the thermal mitigation configuration. For example, referring to FIGS. 1 and 10, the controller 1010 may determine that the rate of change in the NAND temperature of the NVM 110 has slowed down to a point where the rate of change as denoted by the temperature gradient is approximately zero (or neutral). In this regard, the controller 1010 may refrain from enabling any thermal throttling via the thermal power state driver 1020 and resume any storage device operations with the NVM 110 until the temperature gradient indicates a rate of change in temperature.

Figure 12:
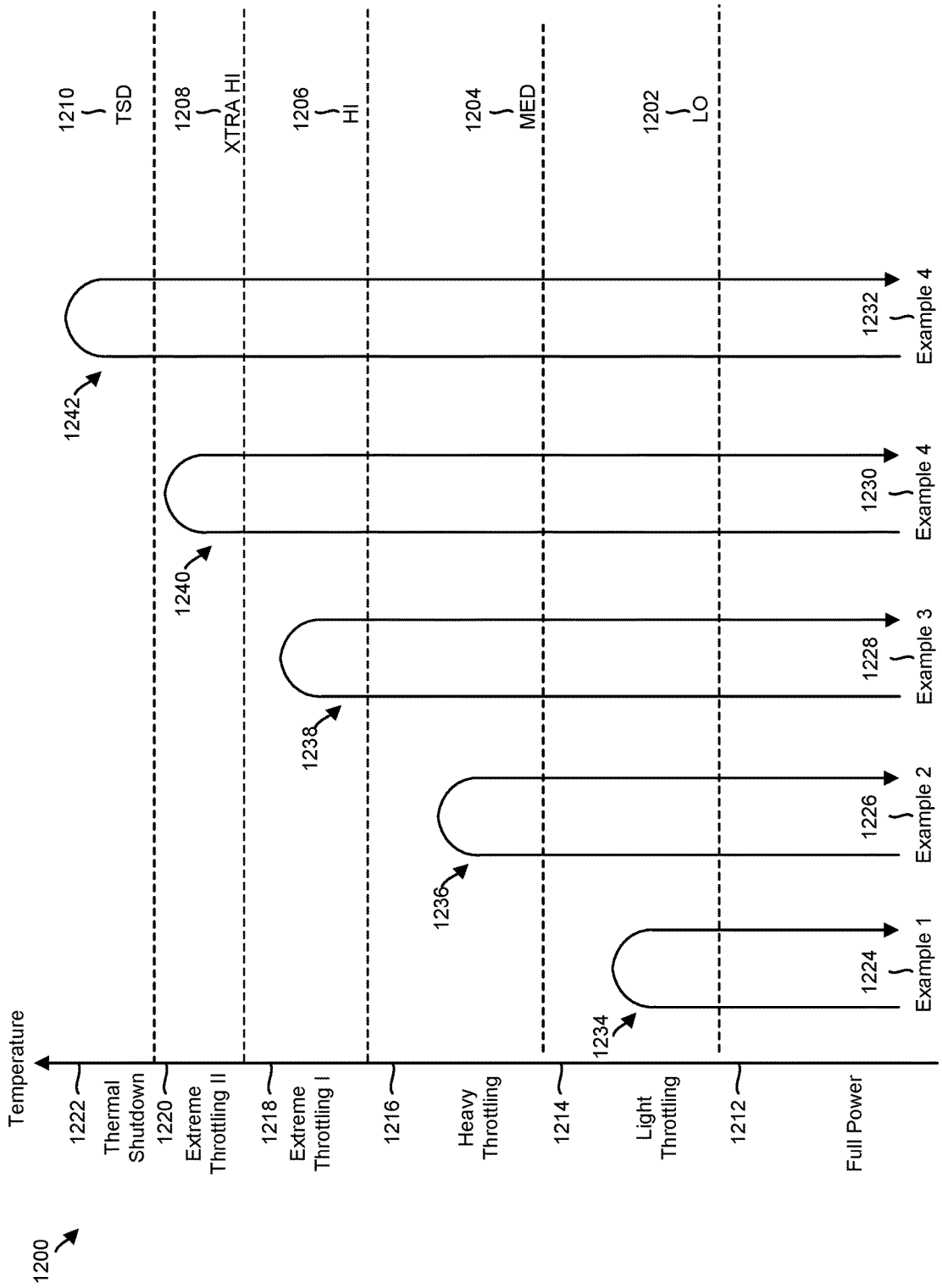
FIG. 12 is a conceptual diagram illustrating various examples of advanced thermal throttling in the storage device of FIG. 1.

FIG. 12 illustrates an example diagram 1200 of advanced thermal throttling in a storage device. In thermal throttling, the controller increasingly limits access to the cells as the temperature rises in order to cool down the storage device. For example, the cells may be contained in one or more dies, and the controller may disable parallel access to an increasing number of dies as the temperature exceeds various thermal thresholds. In the example diagram 1200, several thermal thresholds are configured for different levels of throttling, including a low (LO) thermal threshold 1202, a medium (MED) thermal threshold 1204, a high (HI) thermal threshold 1206, an extra high (XTRA HI) thermal threshold 1208, and a thermal shut down (TSD) thermal threshold 1210. For example, in the case of QLC temperatures, LO thermal threshold 1202 may be 80° or another degree, MED thermal threshold 1204 may be 86° or another degree, HI thermal threshold 1206 may be 92° or another degree, XTRA HI thermal threshold 1208 may be 94° or another degree, and TSD thermal threshold 1208 may be the maximum write temperature, e.g. 95° or another degree. These thermal thresholds are merely examples; any number of temperature thermal thresholds of varying degrees may be used. Moreover, the thermal thresholds may change depending on the cell type. For instance, in the case of TLC temperatures, the thermal thresholds may all be higher, while in the case of PLC temperatures, the thermal thresholds may all be lower.

The controller may perform different levels of throttling as the temperature of the cells exceeds the various thermal thresholds in order to more quickly reduce the temperature. For instance, when reducing die parallelism, the controller may apply light throttling 1214 (e.g. throttling one die) when the temperature exceeds the LO thermal threshold 1202, heavy throttling 1216 (e.g. throttling two dies) when the temperature exceeds the MED thermal threshold 1204, first-tier extreme throttling 1218 (e.g. throttling three dies) when the temperature exceeds the HI thermal threshold 1206, second-tier extreme throttling 1220 when the temperature exceeds the XTRA HI thermal threshold 1208, and thermal shutdown 1222 (e.g. shutting down access to the dies) when the temperature exceeds the TSD thermal threshold 1210. Other examples of throttling may be used; for instance, instead of disabling parallel access to one, two, or three dies, respectively, the storage device may disable parallel access to different numbers of dies, prevent reads or writes to different number of dies, restrict or limit access to different numbers or types of memory locations on the same die, or perform other temperature reducing schemes.

Accordingly, FIG. 12 illustrates various examples 1224, 1226, 1228, 1230, 1232 of different throttling level operations as the temperature 1234, 1236, 1238, 1240, 1242 of the cells rises, for example, due to read or write operations or ambient temperature increases. Referring to the first example 1224, the storage device initially operates in a full power region 1212, e.g. without throttling. When the temperature 1234 exceeds the LO thermal threshold 1202, the controller performs light throttling 1214. In this example, light throttling 1214 is sufficient to cause the temperature to taper off, and throttling is continued to be performed until the temperature decreases below the LO thermal threshold 1202. The storage device then disables throttling, resuming full power operation.

Referring to the second example 1226, the storage device initially operates in the full power region 1212 without throttling. However, unlike the first example, when the temperature 1236 exceeds the LO thermal threshold 1202, light throttling 1214 is insufficient to reduce the temperature, and so the temperature 1236 continues to increase. When the temperature exceeds the MED thermal threshold 1204, the controller performs heavy throttling 1216. In this example, heavy throttling 1216 is sufficient to cause the temperature to taper off, and throttling is continued to be performed until the temperature decreases below the MED thermal threshold 1204. At that point, the controller switches to light throttling 1214, which is continued to be performed until the temperature decreases below the LO thermal threshold 1202. The storage device then disables throttling, resuming full power operation.

Referring to the third example 1228, the storage device initially operates in the full power region 1212 without throttling. However, unlike the first and second examples, when the temperature 1238 exceeds the LO thermal threshold 1202 and MED thermal thresholds 1204, light throttling 1214 and heavy throttling 1216 are insufficient to reduce the temperature, and so the temperature 1238 continues to increase. When the temperature 1238 exceeds the HI thermal threshold 1206, the controller performs extreme throttling 1216. In this example, first-tier extreme throttling 1218 is sufficient to cause the temperature to taper off, and throttling is continued to be performed until the temperature decreases below the HI thermal threshold 1206. At that point, the controller switches to heavy throttling 1216, which is continued to be performed until the temperature decreases below the MED thermal threshold 1204. At that point, the controller switches to light throttling 1214, which is continued to be performed until the temperature decreases below the LO thermal threshold 1202. The storage device then disables throttling, resuming full power operation.

Referring to the fourth example 1230, the storage device initially operates in the full power region 1212 without throttling. However, unlike the first through third examples, when the temperature 1240 exceeds the LO thermal threshold 1202, MED thermal threshold 1204 and HI threshold 1206, light throttling 1214, heavy throttling 1216 and first-tier extreme throttling 1218 are insufficient to reduce the temperature, and so the temperature 1240 continues to increase. When the temperature exceeds the XTRA HI thermal threshold 1208, the controller performs second-tier extreme throttling 1220. In this example, second-tier extreme throttling 1220 is sufficient to cause the temperature to taper off, and throttling is continued to be performed until the temperature decreases below the XTRA HI thermal threshold 1208. At that point, the controller switches to first-tier extreme throttling 1218, which is continued to be performed until the temperature decreases below the HI thermal threshold 1206. At that point, the controller switches to heavy throttling 1216, which is continued to be performed until the temperature decreases below the MED thermal threshold 1204. At that point, the controller switches to light throttling 1214, which is continued to be performed until the temperature decreases below the LO thermal threshold 1202. The storage device then disables throttling, resuming full power operation.

Referring to the fifth example 1232, the storage device initially operates in the full power region 1212 without throttling. However, unlike the first through fourth examples, when the temperature 1242 exceeds the LO thermal threshold 1202, the MED thermal threshold 1204, the HI thermal threshold 1206, light throttling 1214, heavy throttling 1216, first-tier extreme throttling 1218 are insufficient to reduce the temperature, and so the temperature 1242 continues to increase. When the temperature exceeds the XTRA HI thermal threshold 1208, the controller performs second-tier extreme throttling 1220. In this example, second-tier extreme throttling 1220 is insufficient to cause the temperature to taper off, so the temperature continues to increase until it reaches the TSD thermal threshold 1210. At this point, the controller performs thermal shutdown 1222, for instance, shutting down access to the cells and/or the storage device until the temperature decreases back to the normal level.

Figure 13:
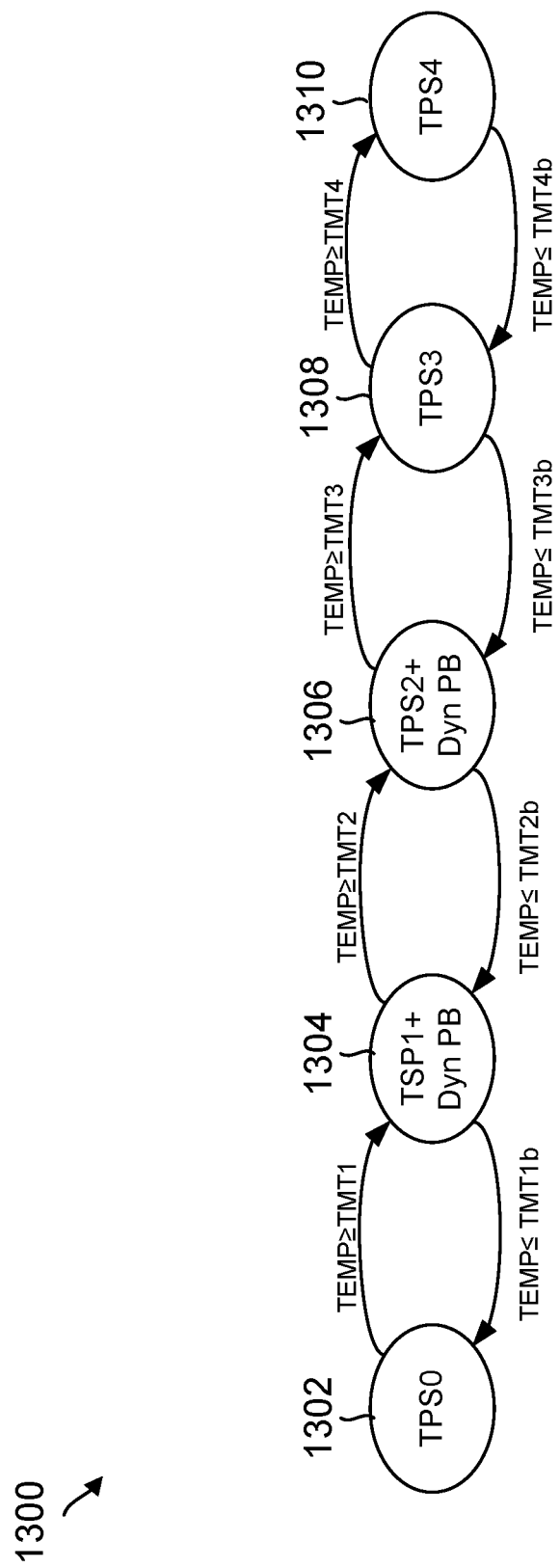
FIG. 13 is a conceptual diagram illustrating a state machine of multiple thermal power states for advanced thermal throttling in the storage device of FIG. 1.

FIG. 13 is a conceptual diagram illustrating a state machine 1300 of multiple thermal power states for advanced thermal throttling in the storage device of FIG. 1. The state machine 1300 may include a finite number of thermal power states. For example, the state machine 1300 includes a first thermal power state 1302 (TPS0) that represents the state of the storage device without thermal throttling, a second thermal power state 1304 (TPS1) that is associated with a first thermal threshold (TMT1), a third thermal power state 1306 (TPS2) that is associated with a second thermal threshold (TMT2), a fourth thermal power state 1308 (TPS3) that is associated with a third thermal threshold (TMT3), and a fifth thermal power state 1310 (TPS4) that is associated with a fourth thermal threshold (TMT4).

In some aspects, referring to FIGS. 1 and 10, when the temperature of the NVM 110 is determined to meet (or exceed) TMT1, the state machine 1300 indicates a transition from TPS0 1302 to TPS1 1304. Similarly, when the temperature of the NVM 110 is determined to meet (or exceed) TMT2, the state machine 1300 indicates a transition from TPS1 1304 to TPS2 1306. Conversely, when the temperature of the NVM 110 is determined to meet (or not exceed) TMT1b, the state machine 1300 indicates a transition back from TPS1 1304 to TPS0 1302. In some aspects, TMT1b is lesser than TMT1. For example, TMT1 may be set to 80° C. and TMT1b may be set to 77° C.

When the temperature of the NVM 110 is determined to meet (or exceed) TMT3, the state machine 1300 indicates a transition from TPS2 1306 to TPS3 1308. Conversely, when the temperature of the NVM 110 is determined to meet (or not exceed) TMT2b, the state machine 1300 indicates a transition back from TPS2 1306 to TPS1 1304. In some aspects, TMT2b is lesser than TMT2. For example, TMT2 may be set to 86° C. and TMT2b may be set to 83° C.

When the temperature of the NVM 110 is determined to meet (or exceed) TMT4, the state machine 1300 indicates a transition from TPS3 1308 to TPS4 1310. Conversely, when the temperature of the NVM 110 is determined to meet (or not exceed) TMT3b, the state machine 1300 indicates a transition back from TPS3 1308 to TPS2 1306. In some aspects, TMT3b is lesser than TMT3. For example, TMT3 may be set to 92° C. and TMT3b may be set to 89° C. Similarly, when the temperature of the NVM 110 is determined to meet (or not exceed) TMT4b, the state machine 1300 indicates a transition back from TPS4 1310 to TPS3 1308. In some aspects, TMT4b is lesser than TMT4. For example, TMT4 may be set to 94° C. and TMT4b may be set to 92° C.

Figure 14:
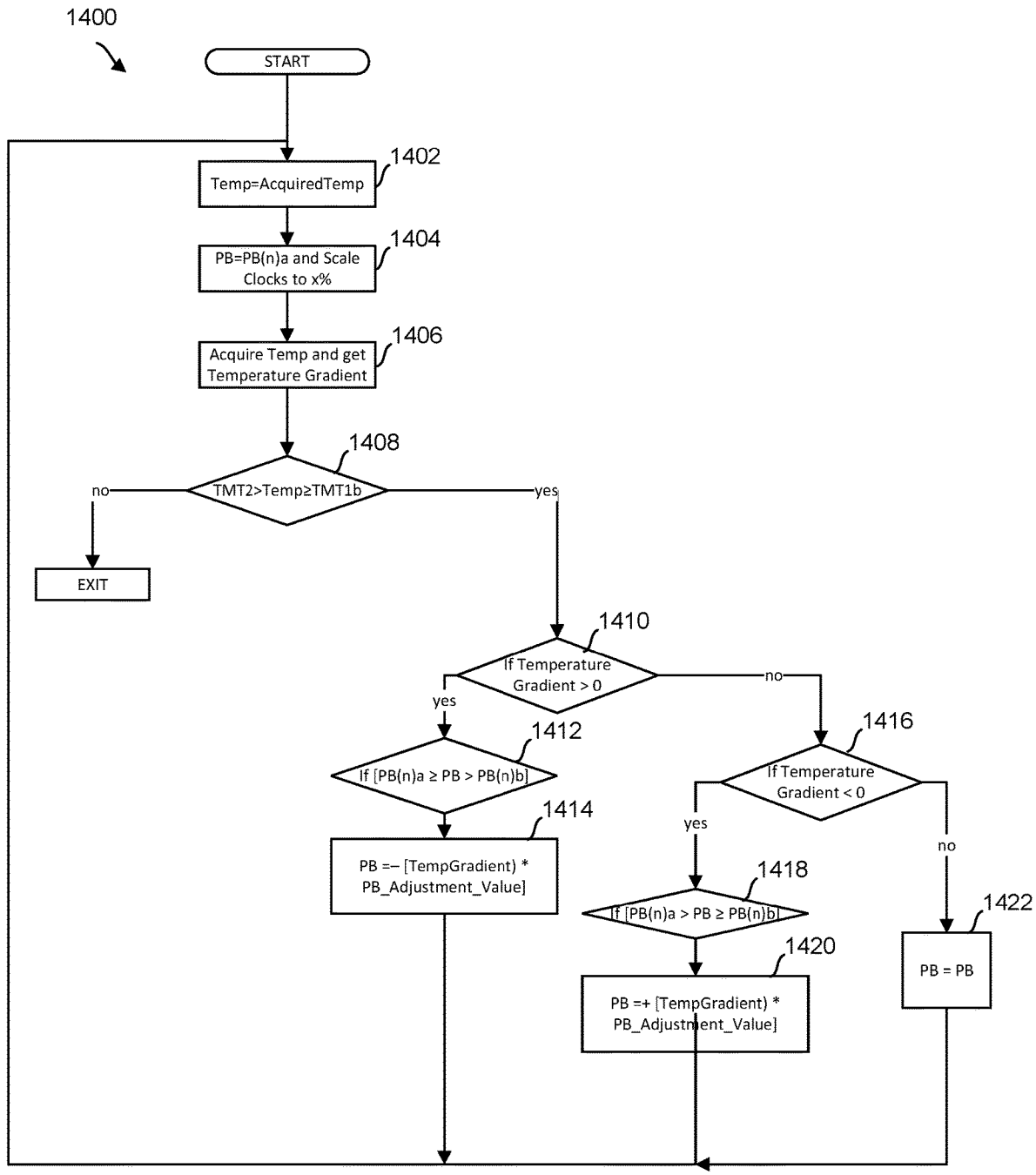
FIG. 14 is a flow chart illustrating an exemplary process for a first thermal power state of the advanced thermal throttling in the storage device of FIG. 1.

FIG. 14 is a flow chart illustrating an exemplary process for a first thermal power state of the advanced thermal throttling in the storage device of FIG. 1. For example, the method can be carried out in a storage device 102, such as the one illustrated in FIG. 1. Each of the steps in the flow chart can be controlled using the controller as described below (e.g. controller 123, 802, 1010), or by some other suitable means.

In one or more implementations, referring to FIGS. 10 and 13, the controller 1010 may transition into a first thermal power state (e.g., TPS1 1304) of a plurality of thermal power states (e.g., TPS1-TPS4). In some aspects, the controller 1010 may apply a thermal mitigation configuration by applying one or more thermal mitigation parameters of a first thermal mitigation configuration associated with the first thermal power state.

As represented by block 1402, the controller acquires the temperature. For example, referring to FIGS. 1 and 10, the controller 1010 may measure a first temperature of the NVM 110 in the first thermal power state based on the applied one or more thermal mitigation parameters of the first thermal mitigation configuration.

As represented by block 1404, the controller 1010 may apply a power budget adjustment (e.g., PB=PB(n)a and apply a clock frequency scaling adjustment to a first predetermined percentage (e.g., x=60% of full clock rate).

As represented by block 1406, the controller 1010 may determine a temperature gradient from the measured first temperature. For example, the controller 1010 may determine whether the rate of change in the measured temperature is positive (increasing), negative (decreasing) or neutral (no change).

As represented by block 1408, the controller 1010 may determine that the measured first temperature is greater than an exit thermal threshold associated with the first thermal power state and lesser than an entry thermal threshold associated with a second thermal power state of the plurality of thermal power states (e.g., TMT2>Temp>TMT1b). Otherwise, the process exits the thermal power state.

As represented by block 1410, the controller 1010 may determine whether the temperature gradient indicates that the measured first temperature is in a thermal equilibrium. In other words, he controller 1010 may determine whether the temperature gradient is equivalent to a zero value. For example, as represented by block 1410, the controller 1010 determines that the temperature gradient is positive (or greater than zero) and proceeds to block 1412. Alternatively, for example, as represented by block 1410, the controller 1010 determines that the temperature gradient is not positive (or not greater than zero) and proceeds to block 1416.

As represented by block 1416, the controller 1010 determines that the temperature gradient is negative (or lesser than zero) and proceeds to block 1418. Otherwise, the controller 1010 determines that the temperature gradient is not negative and proceeds to block 1422.

As represented by blocks 1412 and 1418, the controller 1010 may adjust a first power budget parameter of the first thermal mitigation configuration when the temperature gradient indicates that the measured first temperature is not in the thermal equilibrium. As represented by block 1414, the controller 1010 may adjust the power consumption by reducing the power budget value proportionate to the degree of change in the temperature gradient when the temperature gradient indicates a positive rate of change in temperature. As represented by block 1420, the controller 1010 may adjust the power consumption by increasing the power budget value proportionate to the degree of change in the temperature gradient when the temperature gradient indicates a negative rate of change in temperature.

As represented by block 1422, the controller 1010 may refrain from adjusting the first power budget parameter when the temperature gradient indicates that the measured first temperature is in the thermal equilibrium. In this regard, the controller 1010 determines that there is no rate of change in the temperature (hence the temperature equilibrium). As such, the power budget parameter remains unchanged.

Figure 15:
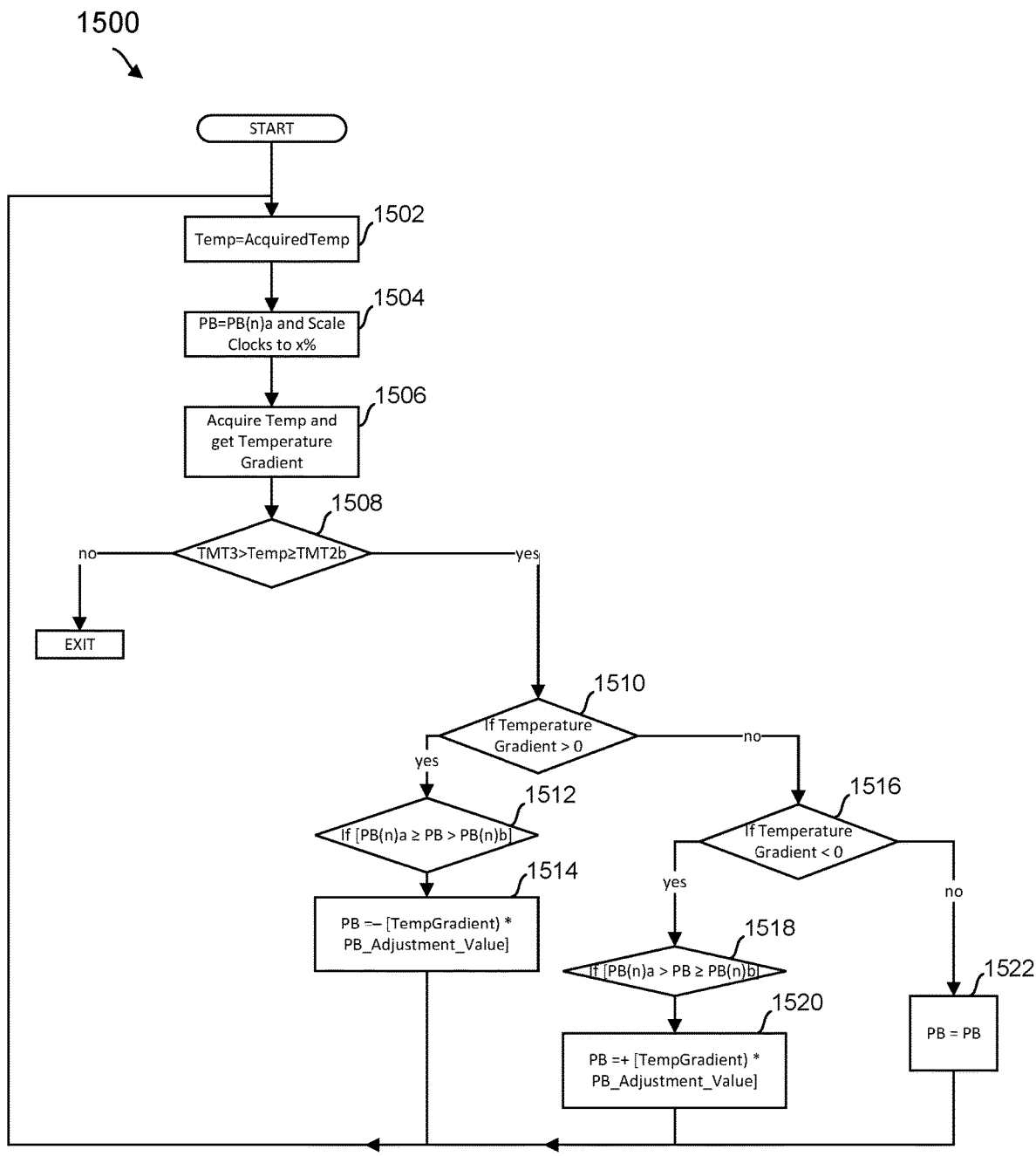
FIG. 15 is a flow chart illustrating an exemplary process for a second thermal power state of the advanced thermal throttling in the storage device of FIG. 1.

FIG. 15 is a flow chart illustrating an exemplary process for a second thermal power state of the advanced thermal throttling in the storage device of FIG. 1. For example, the method can be carried out in a storage device 102, such as the one illustrated in FIG. 1. Each of the steps in the flow chart can be controlled using the controller as described below (e.g. controller 123, 802, 1010), or by some other suitable means.

In one or more implementations, referring to FIGS. 10 and 13, the controller 1010 may transition into a second thermal power state (e.g., TPS2 1306) of the plurality of thermal power states (e.g., TPS1-TPS4). In some aspects, the controller 1010 may apply a thermal mitigation configuration by applying one or more thermal mitigation parameters of a second thermal mitigation configuration associated with the second thermal power state.

As represented by block 1502, the controller acquires the temperature. For example, referring to FIGS. 1 and 10, the controller 1010 may measure a second temperature of the NVM 110 in the second thermal power state based on the applied one or more thermal mitigation parameters of the second thermal mitigation configuration.

As represented by block 1504, the controller 1010 may apply a power budget adjustment (e.g., PB=PB(n)a and apply a clock frequency scaling adjustment to a second predetermined percentage (e.g., x=40% of full clock rate).

As represented by block 1506, the controller 1010 may determine a temperature gradient from the measured second temperature. For example, the controller 1010 may determine whether the rate of change in the measured temperature is positive (increasing), negative (decreasing) or neutral (no change).

As represented by block 1508, the controller 1010 may determine that the measured second temperature is greater than an exit thermal threshold associated with the second thermal power state and lesser than an entry thermal threshold associated with a third thermal power state of the plurality of thermal power states (e.g., TMT3>Temp>TMT2b). Otherwise, the process exits the thermal power state.

As represented by block 1510, the controller 1010 may determine whether the temperature gradient indicates that the measured second temperature is in a thermal equilibrium. In other words, he controller 1010 may determine whether the temperature gradient is equivalent to a zero value. For example, as represented by block 1510, the controller 1010 determines that the temperature gradient is positive (or greater than zero) and proceeds to block 1512. Alternatively, for example, as represented by block 1510, the controller 1010 determines that the temperature gradient is not positive (or not greater than zero) and proceeds to block 1516.

As represented by block 1516, the controller 1010 determines that the temperature gradient is negative (or lesser than zero) and proceeds to block 1518. Otherwise, the controller 1010 determines that the temperature gradient is not negative and proceeds to block 1522.

As represented by blocks 1512 and 1518, the controller 1010 may adjust a second power budget parameter of the second thermal mitigation configuration when the temperature gradient indicates that the measured second temperature is not in the thermal equilibrium. As represented by block 1514, the controller 1010 may adjust the power consumption by reducing the power budget value proportionate to the degree of change in the temperature gradient when the temperature gradient indicates a positive rate of change in temperature. As represented by block 1520, the controller 1010 may adjust the power consumption by increasing the power budget value proportionate to the degree of change in the temperature gradient when the temperature gradient indicates a negative rate of change in temperature.

As represented by block 1522, the controller 1010 may refrain from adjusting the second power budget parameter when the temperature gradient indicates that the measured second temperature is in the thermal equilibrium. In this regard, the controller 1010 determines that there is no rate of change in the temperature (hence the temperature equilibrium). As such, the power budget parameter remains unchanged.

Figure 16:
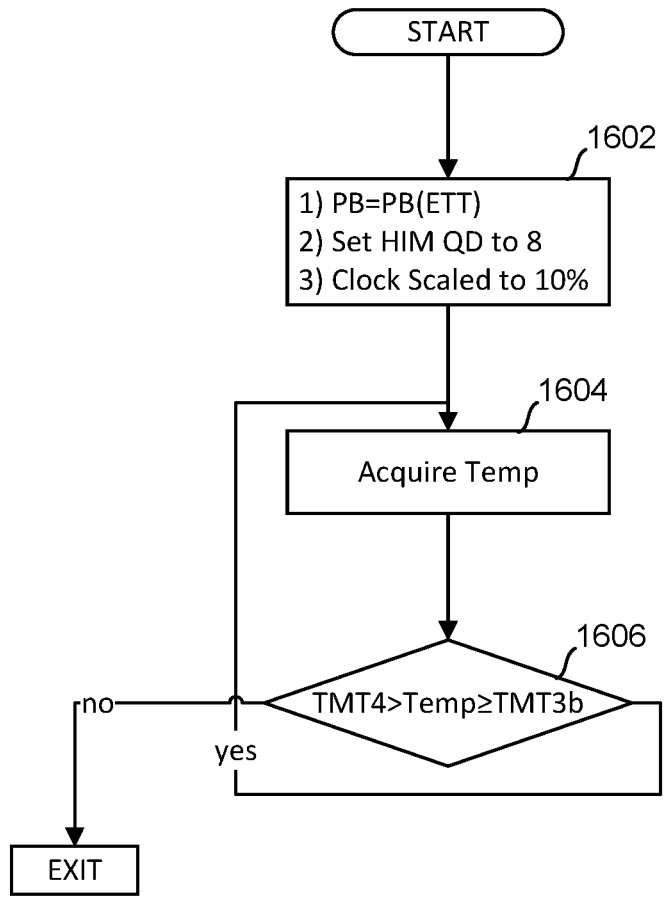
FIG. 16 is a flow chart illustrating an exemplary process for a third thermal power state of the advanced thermal throttling in the storage device of FIG. 1.

FIG. 16 is a flow chart illustrating an exemplary process for a third thermal power state of the advanced thermal throttling in the storage device of FIG. 1. For example, the method can be carried out in a storage device 102, such as the one illustrated in FIG. 1. Each of the steps in the flow chart can be controlled using the controller as described below (e.g. controller 123, 802, 1010), or by some other suitable means. In one or more implementations, the controller 1010 may transition into a third thermal power state (e.g., TPS3 1308) of a plurality of thermal power states (e.g., TPS1-TPS4).

As represented by block 1602, the controller 1010 may apply a third thermal mitigation configuration associated with the third thermal power state. In some aspects, the third thermal mitigation configuration sets a power budget for the third thermal power state, which may correspond to a minimum power consumption allocation allowed. In some aspects, the third thermal mitigation configuration decreases a host interface queue depth size from a full queue depth (e.g., at 256) down to a reduced queue depth (e.g., at 8). In other aspects, the third thermal mitigation configuration decreases a clock frequency of the storage device by a predetermined percentage. For example, the third thermal mitigation configuration may scale the clock frequency from a full clock rate (or previous clock rate) down to 10% of the full clock rate.

As represented by block 1604, the controller acquires the temperature. For example, referring to FIGS. 1 and 10, the controller 1010 may measure a third temperature of the memory in the third thermal power state based on the applied one or more thermal mitigation parameters of the third thermal mitigation configuration.

As represented by block 1606, the controller may determine whether the measured third temperature is greater than an exit thermal threshold associated with the third thermal power state and lesser than an entry thermal threshold associated with a fourth thermal power state of the plurality of thermal power states (e.g., TMT4>Temp>TMT3b). If the measured third temperature satisfies the condition, then the process proceeds back to block 1604. Otherwise, the process exits the thermal power state.

Figure 17:
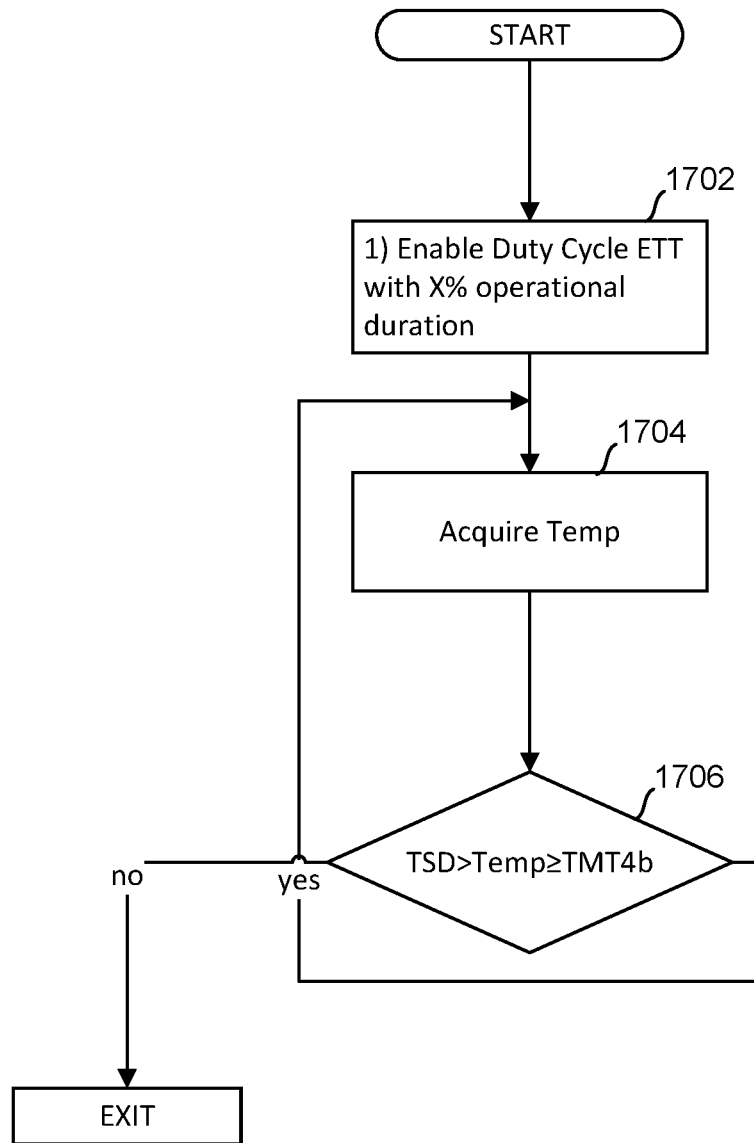
FIG. 17 is a flow chart illustrating an exemplary process for a fourth thermal power state of the advanced thermal throttling in the storage device of FIG. 1.

FIG. 17 is a flow chart illustrating an exemplary process for a fourth thermal power state of the advanced thermal throttling in the storage device of FIG. 1. For example, the method can be carried out in a storage device 102, such as the one illustrated in FIG. 1. Each of the steps in the flow chart can be controlled using the controller as described below (e.g. controller 123, 802, 1010), or by some other suitable means. In one or more implementations, the controller may transition into a fourth thermal power state (e.g., TPS4 1310) of a plurality of thermal power states (e.g., TPS1-TPS4).

As represented by block 1702, the controller 1010 may apply a fourth thermal mitigation configuration associated with the fourth thermal power state. In some aspects, the fourth thermal mitigation configuration sets a power budget for the fourth thermal power state, which may correspond to a minimum power consumption allocation allowed. In some aspects, the fourth thermal mitigation configuration decreases a host interface queue depth size from a full queue depth (e.g., at 256) down to a reduced queue depth (e.g., at 8). In other aspects, the fourth thermal mitigation configuration decreases a clock frequency of the storage device by a predetermined percentage. For example, the fourth thermal mitigation configuration may scale the clock frequency from a full clock rate (or previous clock rate) down to 10% of the full clock rate. Additionally, the fourth thermal mitigation configuration may reduce an operational clock duty cycle (e.g., down to 10% of full clock duty cycle).

As represented by block 1704, the controller acquires the temperature. For example, referring to FIGS. 1 and 10, the controller 1010 may measure a fourth temperature of the memory in the fourth thermal power state based on the applied one or more thermal mitigation parameters of the fourth thermal mitigation configuration.

As represented by block 1706, the controller may determine whether the measured fourth temperature is greater than an exit thermal threshold associated with the fourth thermal power state and lesser than an entry thermal threshold associated with a thermal shutdown state (e.g., TMTSD>Temp>TMT4b). If the measured fourth temperature satisfies the condition, then the process proceeds back to block 1704. Otherwise, the process exits the thermal power state.

Figures 18A, 18B:
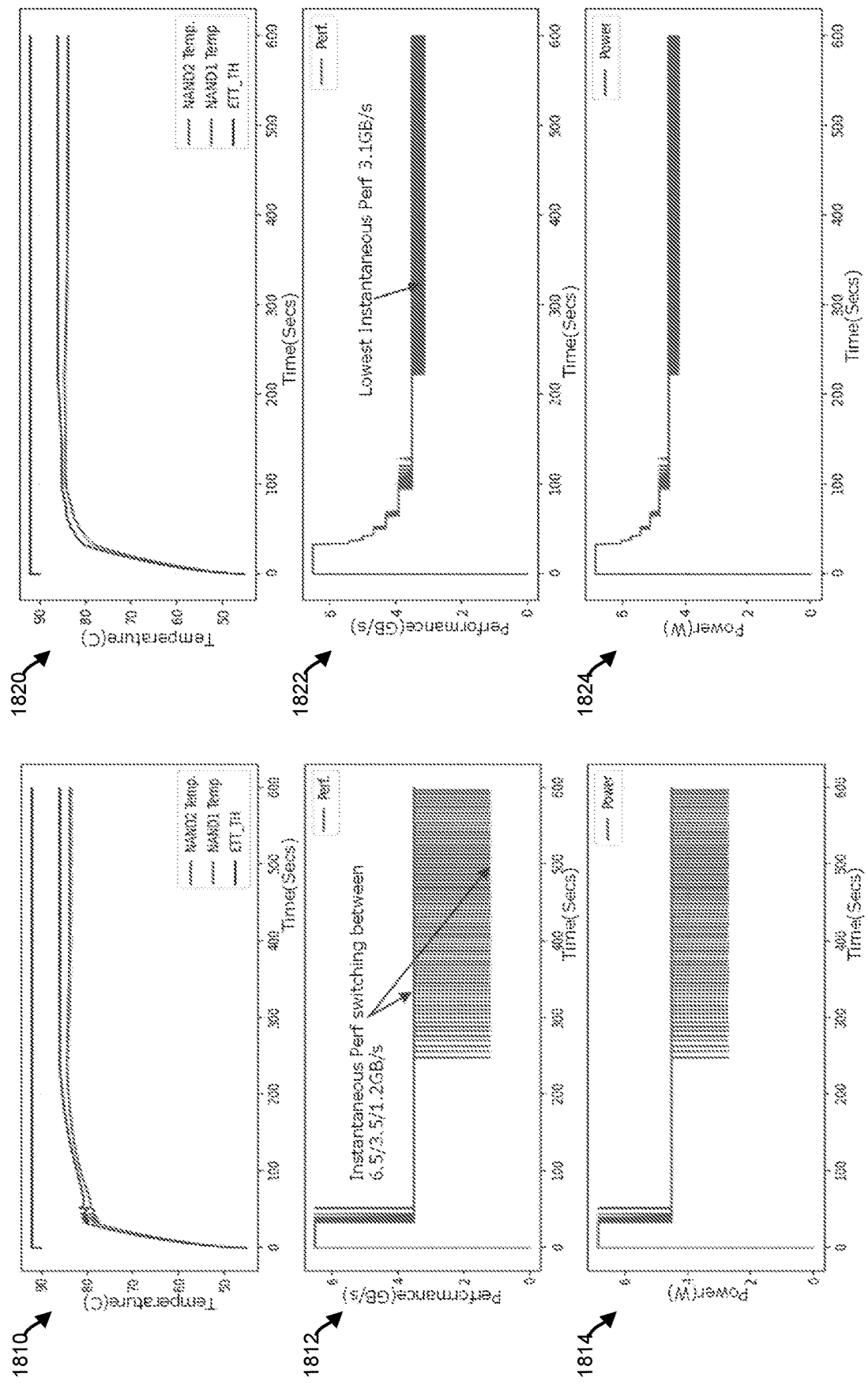
FIG. 18A is a graphical diagram illustrating performance benchmarks with legacy thermal throttling in the storage device of FIG. 1.
FIG. 18B is a graphical diagram illustrating performance benchmarks with advanced thermal throttling in the storage device of FIG. 1.

FIG. 18A are graphical diagrams illustrating performance benchmarks with legacy thermal throttling in the storage device of FIG. 1. FIG. 18A illustrates diagram 1810 that depicts the change in temperature of memory over time, diagram 1812 that depicts the performance of the memory over time based on the change in temperature of the memory, and diagram 1814 that depicts the power consumption of the memory according to the performance of the memory based on the change in temperature of the memory. Diagrams 1812 and 1814 respectively show large variations in the performance and power consumption due to the hard power state transitions under the legacy thermal throttling technique.

FIG. 18B are graphical diagrams illustrating performance benchmarks with advanced thermal throttling in the storage device of FIG. 1. FIG. 18B illustrates diagram 1820 that depicts the change in temperature of memory over time, diagram 1822 that depicts the performance of the memory over time based on the change in temperature of the memory, and diagram 1824 that depicts the power consumption of the memory according to the performance of the memory based on the change in temperature of the memory. In contrast to 18A, diagrams 1822 and 1824 respectively show smaller (and more gradual) variations in the performance and power consumption due to the more gradual power state transitions under the advanced thermal throttling technique with multiple thermal power states.

Accordingly, the storage device of the present disclosure improves performance and user experience without compromising data integrity based on multiple thermal power states. Rather than employing thermal throttling resulting in hard power state transitions when the temperature of the storage device exceeds different thermal throttling thresholds (and consequently reducing performance), the storage device of the present disclosure applies advanced thermal throttling with multiple thermal power states that gradually decrease power respectively based on a temperature gradient along with other thermal mitigation parameters such as dynamic voltage and frequency scaling, queue depth adjustments and bus interconnection scaling. In this way, the storage device of the present disclosure provides improved user experience, enables meeting of performance benchmarks, and maintains data reliability through efficient NAND block usage.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a memory; and
a controller coupled to the memory and configured to:
determine whether a temperature of the memory meets a thermal throttling threshold of a plurality of thermal throttling thresholds,
transition into a thermal power state of a plurality of thermal power states in response to the temperature meeting the thermal throttling threshold,
apply a thermal mitigation configuration associated with the thermal power state,
determine whether the temperature of the memory reaches a thermal equilibrium in the thermal power state in response to the thermal mitigation configuration,
refrain from further applying the thermal mitigation configuration in response to the temperature of the memory reaching the thermal equilibrium,
acquire the temperature of the memory at a first sampling rate before the temperature of the memory meets the thermal throttling threshold, and
acquire the temperature of the memory at a second sampling rate greater than the first sampling rate in response to the temperature of the memory meeting the thermal throttling threshold.

2. The storage device of claim 1, wherein the controller configured to apply the thermal mitigation configuration is further configured to adjust one or more thermal mitigation parameters associated with the thermal power state.

3. The storage device of claim 2, wherein the controller configured to adjust the one or more thermal mitigation parameters is further configured to adjust a power budget parameter based on a temperature gradient associated with the temperature, the power budget parameter indicating an amount of power consumption allocated to the storage device in the thermal power state.

4. The storage device of claim 3, wherein the controller configured to adjust the power budget parameter is further configured to reduce a value of the power budget parameter in response to the temperature gradient indicating a positive rate of change in the temperature, wherein the value of the power budget parameter is reduced until the temperature gradient indicates the thermal equilibrium.

5. The storage device of claim 3, wherein the controller configured to adjust the power budget parameter is further configured to increase a value of the power budget parameter in response to the temperature gradient indicating a negative rate of change in the temperature, wherein the value of the power budget parameter is increased until the temperature gradient indicates the thermal equilibrium.

6. The storage device of claim 2, wherein the controller configured to adjust the one or more thermal mitigation parameters is further configured to adjust a clock frequency parameter associated with one or more clock domains of the storage device with a value that corresponds to a predetermined clock frequency associated with the thermal power state.

7. The storage device of claim 2, wherein the controller configured to adjust the one or more thermal mitigation parameters is further configured to adjust a voltage parameter associated with one or more voltage domains of the storage device with a value that corresponds to a predetermined voltage associated with the thermal power state.

8. The storage device of claim 2, wherein the controller configured to adjust the one or more thermal mitigation parameters is further configured to adjust a bus interface parameter associated with an interconnection between the memory and the controller with a value that corresponds to a predetermined number of interconnection lanes associated with the thermal power state.

9. The storage device of claim 1, wherein the controller configured to transition into the thermal power state is further configured to transition into a first thermal power state of the plurality of thermal power states, wherein the controller configured to apply the thermal mitigation configuration is further configured to apply one or more first thermal mitigation parameters of a first thermal mitigation configuration associated with the first thermal power state, wherein the controller is further configured to:
measure a first temperature of the memory in the first thermal power state based on the one or more first thermal mitigation parameters of the first thermal mitigation configuration,
determine a first temperature gradient from the measured first temperature,
determine whether the measured first temperature is greater than a first exit thermal throttling threshold associated with the first thermal power state and lesser than a first entry thermal throttling threshold associated with a second thermal power state of the plurality of thermal power states,
determine, in response to the measured first temperature being greater than the first exit thermal throttling threshold and lesser than the first entry thermal throttling threshold, whether the first temperature gradient indicates that the measured first temperature is in thermal equilibrium,
adjust a first power budget parameter of the first thermal mitigation configuration in response to the first temperature gradient indicating that the measured first temperature is not in thermal equilibrium, and
refrain from adjusting the first power budget parameter in response to the first temperature gradient indicating that the measured first temperature is in thermal equilibrium.

10. The storage device of claim 9, wherein the controller configured to transition into the thermal power state is further configured to transition into the second thermal power state, wherein the controller configured to apply the thermal mitigation configuration is further configured to apply one or more second thermal mitigation parameters of a second thermal mitigation configuration associated with the second thermal power state, wherein the controller is further configured to:
measure a second temperature of the memory in the second thermal power state based on the one or more second thermal mitigation parameters of the second thermal mitigation configuration, determine a second temperature gradient from the measured second temperature, determine whether the measured second temperature is greater than a second exit thermal throttling threshold associated with the second thermal power state and lesser than a second entry thermal throttling threshold associated with a third thermal power state of the plurality of thermal power states, determine, in response to the measured second temperature being greater than the second exit thermal throttling threshold and lesser than the second entry thermal throttling threshold, whether the second temperature gradient indicates that the measured second temperature is in thermal equilibrium, adjust a second power budget parameter of the second thermal mitigation configuration in response to the second temperature gradient indicating that the measured second temperature is not in thermal equilibrium, and refrain from adjusting the second power budget parameter in response to the second temperature gradient indicating that the measured second temperature is in thermal equilibrium.

11. The storage device of claim 10, wherein the controller configured to transition into the thermal power state is further configured to transition into the third thermal power state, wherein the controller configured to apply the thermal mitigation configuration is further configured to apply one or more third thermal mitigation parameters of a third thermal mitigation configuration associated with the third thermal power state, wherein the controller is configured to decrease a queue depth size and decrease a clock frequency by a predetermined percentage in the third thermal mitigation configuration, wherein the controller is further configured to:

measure a third temperature of the memory in the third thermal power state based on the one or more third thermal mitigation parameters of the third thermal mitigation configuration, and maintain the third thermal power state in response to the measured third temperature being greater than a third exit thermal throttling threshold associated with the third thermal power state and lesser than a third entry thermal throttling threshold associated with a fourth thermal power state of the plurality of thermal power states.

12. The storage device of claim 11, wherein the controller configured to transition into the thermal power state is further configured to transition into the fourth thermal power state, wherein the controller configured to apply the thermal mitigation configuration is further configured to apply one or more fourth thermal mitigation parameters of a fourth thermal mitigation configuration associated with the fourth thermal power state, wherein the controller is configured to decrease a clock duty cycle in the fourth thermal mitigation configuration, wherein the controller is further configured to:

measure a fourth temperature of the memory in the fourth thermal power state based on the one or more fourth thermal mitigation parameters of the fourth thermal mitigation configuration, and maintain the fourth thermal power state in response to the measured fourth temperature being greater than a fourth exit thermal throttling threshold associated with the fourth thermal power state and lesser than a fourth entry thermal throttling threshold associated with a thermal shutdown state of the plurality of thermal power states.

13. A storage device, comprising:

a memory; and a controller coupled to the memory and configured to:

adjust one or more thermal mitigation parameters including a bus interface parameter associated with a thermal power state of a plurality of thermal power states following a transition into the thermal power state in response to a temperature of the memory meeting a thermal throttling threshold, the bus interface parameter being associated with an interconnection between the memory and the controller and adjusted with a value that corresponds to a predetermined number of interconnection lanes associated with the thermal power state, and refrain from further adjusting the one or more thermal mitigation parameters in response to a determination that the temperature of the memory has reached a thermal equilibrium in the thermal power state responsive to the adjusted one or more thermal mitigation parameters.

14. The storage device of claim 13, wherein the controller configured to adjust the one or more thermal mitigation parameters is further configured to adjust a power budget parameter based on a temperature gradient associated with the temperature, the power budget parameter indicating an amount of power consumption allocated to the storage device in the thermal power state for maintaining performance of one or more storage operations of the storage device.

15. The storage device of claim 13, wherein the controller configured to adjust the one or more thermal mitigation parameters is further configured to adjust a clock frequency parameter associated with one or more clock domains of the storage device to correspond to a predetermined clock frequency associated with the thermal power state.

16. The storage device of claim 13, wherein the controller configured to adjust the one or more thermal mitigation parameters is further configured to adjust a voltage parameter associated with one or more voltage domains of the storage device to correspond to a predetermined voltage associated with the thermal power state.

17. The storage device of claim 13, wherein the controller is further configured to:

acquire the temperature of the memory at a first sampling rate before the temperature of the memory meets the thermal throttling threshold, and acquire the temperature of the memory at a second sampling rate greater than the first sampling rate in response to the temperature of the memory meeting the thermal throttling threshold.

18. A storage device, comprising:

a memory having a block of cells; and a controller coupled to the memory and configured to:

apply a thermal mitigation configuration associated with a thermal power state of a plurality of thermal power states following a transition into the thermal power state responsive to a temperature of the block of cells meeting a thermal throttling threshold, the thermal mitigation configuration configuring a decrease in a queue depth size, determine whether the temperature of the block of cells reaches a thermal equilibrium in the thermal power state in response to the thermal mitigation configuration, and refrain from further applying the thermal mitigation configuration in response to the temperature reaching the thermal equilibrium.

19. The storage device of claim 18, wherein the controller configured to apply the thermal mitigation configuration is further configured to:
- adjust a power budget parameter based on a temperature gradient associated with the temperature, the power budget parameter indicating an amount of power consumption allocated to the storage device in the thermal power state,
- adjust a clock frequency parameter associated with one or more clock domains of the storage device to correspond to a predetermined clock frequency associated with the thermal power state,
- adjust a voltage parameter associated with one or more voltage domains of the storage device to correspond to a predetermined voltage associated with the thermal power state, and
- adjust a bus interface parameter associated with an interconnection between the memory and the controller to correspond to a predetermined number of interconnection lanes associated with the thermal power state.

* * * * *